(12) United States Patent
Yoshiura et al.

(10) Patent No.: US 6,889,211 B1
(45) Date of Patent: May 3, 2005

(54) METHOD AND SYSTEM FOR DISTRIBUTING MULTIMEDIA DATA WITH MANAGEMENT INFORMATION

(75) Inventors: Hiroshi Yoshiura, Tokyo (JP); Ryoichi Sasaki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 09/628,719

(22) Filed: Jul. 28, 2000

(30) Foreign Application Priority Data

Jul. 28, 1999 (JP) .......................................... 11-213802

(51) Int. Cl.$^7$ .............................................. G06F 17/60
(52) U.S. Cl. ............................. 705/58; 705/51; 705/53; 707/1; 707/3; 707/4
(58) Field of Search ............................. 705/58, 51, 53; 707/3, 1.4; 380/1–273; 713/150–182

(56) References Cited

U.S. PATENT DOCUMENTS

| | | | | |
|---|---|---|---|---|
| 5,862,223 A | * | 1/1999 | Walker et al. ................. | 705/50 |
| 6,061,451 A | * | 5/2000 | Muratani et al. ............ | 380/201 |
| 6,226,618 B1 | * | 5/2001 | Downs et al. .................. | 705/1 |
| 6,230,268 B1 | * | 5/2001 | Miwa et al. ................. | 713/176 |

FOREIGN PATENT DOCUMENTS

| | | | | |
|---|---|---|---|---|
| EP | 0 896 452 A2 | 2/1999 | | |
| EP | 0 898 396 A2 | 2/1999 | | |
| JP | 10276321 A | * 10/1998 | .......... | H04N/1/387 |
| WO | WO 98/44402 | 10/1998 | | |

OTHER PUBLICATIONS

Alex Simeonides: Protecting your Online Assets. May 4, 1999. http://webserver.cpg.com/features/f3/2.7/; Retrieved online Mar. 19, 2004.*

Jin Zhao, "A WWW Service to Embed and Prove Digital Copyright Watermarks", Proceedings of the European Conference on Multimedia Applications, vol. 2, 1996, pp. 695–709, XP000199921, Louvain, Belgium.

* cited by examiner

*Primary Examiner*—James P. Trammell
*Assistant Examiner*—James A. Reagan
(74) *Attorney, Agent, or Firm*—Antonelli, Terry, Stout & Kraus, LLP

(57) ABSTRACT

A multimedia data distributing system comprising an ID issuing center side device and a multimedia data distributor side device for distributing multimedia data as electronic data to a purchaser of the multimedia data. The multimedia data distributor device includes: an attribute information transmitting unit that transmits attribute information of the electronic data indicating the multimedia data to be distributed, to the ID issuing center side device; a watermark information embedding unit that embeds information specifying the ID number transmitted from the ID issuing center side device in response to the attribute information transmitted to the attribute information transmitting unit, as an watermark information in the electronic data indicating the multimedia data to be distributed; and a distribution unit that distributes the electronic data indicating the multimedia data, in which the information specifying the ID number is embedded as the watermark information by the watermark information embedding unit, to the purchaser of the multimedia data. The ID issuing center side device includes: an ID number generating unit that generates a unique ID number and registering the generated ID number in a database in a manner to correspond to the attribute information transmitted by the distributor of the multimedia data; and an ID number transmitting unit that transmits the information specifying the generated ID number to the multimedia data distributor device.

18 Claims, 26 Drawing Sheets

| NUMBER (N DIGITS) | AUTHOR |
|---|---|
| * * * * * * | * * |
| * * * * * * | * * |
| * * * * * * | * * |
| * * * * * * | * * |
| ⋮ | ⋮ |
| * * * * * * | * * |

| NUMBER (M DIGITS) | MULTIMEDIA DATA TITLE |
|---|---|
| * * * * * * | * * |
| * * * * * * | * * |
| * * * * * * | * * |
| * * * * * * | * * |
| ⋮ | ⋮ |
| * * * * * * | * * |

| | ID NUMBER | | | AUTHOR | MULTIMEDIA DATA TITLE | DISTRIBUTOR | PURCHASER |
|---|---|---|---|---|---|---|---|
| | BASIC NUMBER | ADDITIONAL NUMBER | ------ | | | | |
| 401 | * * * * | * * * | ------ | * * * | * * * | * * * | * * * |
| 402 | * * * * | * * * | ------ | * * * | * * * | * * * | * * * |
| 403 | * * * * | | ------ | * * * | * * * | * * * | * * * |
| 404 | * * * * | | ------ | * * * | * * * | * * * | * * * |
| | ┆ | ┆ | ┆ | ┆ | ┆ | ┆ | ┆ |
| 405 | * * * * | | ------ | * * * | * * * | * * * | * * * |

(b)

| | ID NUMBER | | | DISTRIBUTOR | PURCHASER |
|---|---|---|---|---|---|
| | BASIC NUMBER | ADDITIONAL NUMBER | ------ | | |
| 401 | * * * * | * * * | ------ | * * * | * * * |
| 402 | * * * * | * * * | ------ | * * * | * * * |
| 403 | * * * * | | ------ | * * * | * * * |
| 404 | * * * * | | ------ | * * * | * * * |
| | ┆ | ┆ | ┆ | ┆ | ┆ |
| 405 | * * * * | | | * * * | * * * |

ID NUMBER IS COMPOSED OF AUTHOR NUMBER + MULTIMEDIA DATA TITLE + SERIAL NUMBER

METHOD AND SYSTEM FOR DISTRIBUTING MULTIMEDIA DATA WITH MANAGEMENT INFORMATION

This application claims priority from Japanese Patent Application Reference No. 11-213802, filed on Jul. 28, 1999, the entire content of which is incorporated therein by reference for all purpose.

This application is related to a Japanese Patent Application No. 2000-67550, which will be soon filed as a U.S. Patent Application corresponding thereto, and the entire content of which is hereby incorporated by reference for all purpose.

BACKGROUND OF THE INVENTION

The present invention relates to a technology for distributing multimedia data (which is also called the "contents data") as electronic data to a purchaser of the multimedia data and, more particularly, to a technology for managing the multimedia data by embedding the information to manage the distribution route or the like of the multimedia data in the multimedia data by using the electronic watermarking technique.

In recent years, from a viewpoint of protecting the copyright for digitized multimedia data such as image data or voice data, the electronic watermark technology has been highlighted. This electronic watermark technology is a technique for embedding a predetermined information in multimedia data in accordance with a predetermined rule so that the predetermined information cannot be extracted from the multimedia data without using at least the predetermined rule. The predetermined information to be embedded in the multimedia data can be exemplified, in a case In a case where the contents are books, by utilizing the international standard numbers called the "ISBN (International Standard Book Number)" indicating the nationality, the publisher and the book titletitle in ten digits and, in a case In a case where the contents are musics, by utilizing the international standard codes called the "ISRC (International Standard Recording Code)" specifying the voice source.

Here, in recent years, it has been tried to distribute the multimedia data such as the image data or the voice data through a network such as the online system or the Internet. In a case In a case where the multimedia data are to be distributed through the network, it is important how to manage the distribution route of the multimedia data.

In a case where the multimedia data are to be sold by recording them in recording media such as a DVD, a CD-ROM or an FD, the individual distribution routes of the recording media can be managed by printing the serial numbers on the labels of the recording media in addition to the aforementioned ISBN and ISRC or by embedding the multimedia data themselves as the watermark information in the multimedia data themselves, so that the individual shops may manage the serial numbers of the recording media sold by themselves.

The distribution route managing method described above is premised by a fact that the number of recording media having been shipped to the market is known in advance.

In a case where the multimedia data are to be distributed through the network, on the contrary, the individual shops (e.g., distributing persons or companies) copy the multimedia data (or masters) to be purchased, which is held in the shops, when the multimedia data are to be distributed to the purchasers, and then distribute the copies to the purchasers through the network. In other words, the multimedia data are produced at the time of a request for purchasing them, so that the number of multimedia data to be shipped to the market cannot be known in advance.

In this sales mode, too, there has been desired a technology for managing the distribution route.

SUMMARY OF THE INVENTION

An object of the invention is to make it possible to manage the distribution even in new contents sales mode exploiting the features of multimedia data.

Specifically, the invention contemplates to provide a technology for giving unique ID numbers individually to multimedia data to be distributed on the market. This technology makes it possible to verify the multimedia data having the ID numbers embedded therein, by extracting the ID numbers from the multimedia data and by retrieving the database of the ID issuing center.

On the other hand, the invention contemplates to provide a technology to embed, even in a case where once distributed multimedia data are to be copied (namely, re-produced) and distributed again by a distributor (or re-manufacturer) such ID numbers (composed of basic numbers+additional numbers) in the copied data as are related to the ID numbers (composed of the basic numbers) embedded in the original multimedia data. This technology makes it possible by retrieving the database to grasp what distribution route the multimedia data have been distributed on.

According to a first embodiment of the present invention, more specifically, there is provided a method for distributing multimedia data as electronic data to a purchaser of the multimedia data in a multimedia data distribution system, comprising an ID issuing center and a multimedia ddata distributor side device, said method comprising:

at the multimedia data distributor side device:

an attribute information transmitting step of transmitting attribute information of the multimedia data to be distributed, to the ID issuing center side device;

a watermark information embedding step of embedding an ID number or an additional ID number transmitted from the ID issuing center in response to the attribute information transmitting step, as a watermark information in the electronic data indicating the multimedia data to be distributed; and a distribution step of distributing the electronic data indicating the multimedia data, in which the ID number or additional ID number are embedded as the watermark information at the watermark information embedding step, to the purchaser of the multimedia data, and at the ID issuing center side device:

a retrieval step of retrieving the ID number corresponding to the attribute information partially coincident with the attribute information transmitted from the multimedia data distributor device, from the data base in which the ID number already issued by the ID issuing device is registered to correspond to the attribute information, an ID number generating step of generating a unique basic number which is not registered in the database, in a case where the retrieval at the retrieval step results in that the ID number corresponding to the attribute information partially coincident with the attribute information transmitted from the multimedia data distributor is not registered yet in the database, and registering the basic number as the ID number in the database in a manner to correspond to the attribute information transmitted from the multimedia data distributor, and, in a case where the ID number corresponding to the attribute information partially coincident with the attribute information transmitted from the multimedia data distributor is already registered in the database, generating an additional number so that a number obtained by attaching the additional number to the ID number is to be a unique number which is not registered in the database, and registering the number, which has been obtained by attaching the additional number to the ID number, as the ID number in the database in a manner to correspond to the attribute information transmitted from the multimedia data distributor, and an ID number transmitting step of transmitting, in a case where a basic number is generated at the ID number generating step, the basic number as the ID number to the multimedia data distributor, and transmitting, in a case where an additional number is generated at the ID number generating step, the additional number as an additional ID number together with bit number information of the original ID number linked by the additional number at the ID number generating step, to the multimedia data distributor, and wherein the watermark information embedding step embeds, in a case where the additional ID number is transmitted from the ID issuing center, the additional ID number, as a bit string starting from the next bit of the bit string specified by the bit number information sent together with the additional ID number, in the electronic data indicating the multimedia data to be distributed.

Here, the attribute information may include information capable of specifying the title, author, distributor and purchaser of the multimedia data, and the retrieval step may retrieve the ID number, in which the attribute information transmitted from the multimedia data distributor and the titletitle and author of the multimedia data are coincide and which is made to correspond to the attribute information indicating the distributor of the attribute information is the purchaser, from the database.

On the other hand, the aforementioned bit number information may be either the information indicating the bit number (or bit length) of the ID number embedded in the electronic data indicating the multimedia data, or. In a case where the bit length of the basic number or additional number is constant, the information indicating the number of times, at which the basic number or additional number is embedded as the ID number or additional ID number in the electronic data indicating the multimedia data.

According to the present embodiment, the distributor of the multimedia data transmits the attribute information of the multimedia data to be distributed, to the ID issuing center. In response to this, the ID issuing center retrieves the database on whether or not the attribute information (e.g., the attribute information indicating that the attribute information transmitted from the distributor of the multimedia data and the title and author of the multimedia data are coincident and the attribute information indicating that the distributor of the attribute information is the purchaser) partially coincident with the attribute information transmitted from the distributor of the multimedia data are registered. In a case where the attribute information are not registered, it is thought that the multimedia data to be distributed are distributed at first on the market. In this case, the basic numbers or the unique numbers are generated and registered as the ID numbers in the database in a manner to correspond to the attribute information transmitted from the distributor of the multimedia data. In a case where the attribute information are already registered, on the other hand, it is thought that the multimedia data to be distributed have already been distributed and are copied and distributed again (It follows that the ID numbers are already embedded in the electronic data indicating the multimedia data to be distributed). In this case, the additional numbers are generated so that the numbers obtained by attaching the additional numbers to the ID numbers made to correspond to the attribute information partially coincident with the attribute information transmitted from the distributor of the multimedia data, as registered in the database, may be the unique numbers not registered in the database. The numbers, which has been obtained by attaching the additional numbers to the ID numbers, are registered as the ID numbers in the database in a manner to correspond to the attribute information transmitted by the distributor of the multimedia data.

The distributor of the multimedia data embeds the ID numbers or additional ID number thus generated, as the watermark information in the electronic data indicating the multimedia data to be distributed, and distributes the electronic data to the purchaser of the multimedia data. In a case where the additional ID numbers are to be embedded, the ID numbers are already embedded in the electronic data indicating the multimedia data to be distributed so that the additional ID numbers are embedded as the bit string starting from the next bit of the bit string indicating the ID numbers already embedded, in the electronic data.

Here in the present embodiment, the multimedia data distributing system may further include an ID verifying center, and the multimedia data distributing method may further comprise, at the ID verifying center side device, a verification step of extracting the ID number from the electronic data indicating the multimedia data, in which the ID number is embedded as the watermark information, to verify the multimedia data by retrieving the attribute information corresponding to the ID number with the database.

In the present embodiment, on the other hand, the watermark information embedding step may embed, in a case where the ID number is transmitted from the ID issuing center side device, a watermarking method specifying information for specifying an electronic watermarking method used to embed the ID number in the electronic data indicating the multimedia data to be distributed, in the electronic data by a predetermined electronic watermarking method which is determined in advance with the ID verifying center, and the watermark information embedding step embeds, in a case where the additional ID number is transmitted from the ID issuing center, extracts the watermarking method specifying information from the electronic data indicating the multimedia data to be distributed, by the predetermined electronic watermarking method, and embeds the additional ID number in the electronic data by using the electronic watermarking method specified by the extracted watermarking method specifying information.

Thus, the distributor who first embed the ID number in the multimedia data can embed the ID number with the desired electronic watermarking method.

On the other hand, the present embodiment may be modified in the following manner.

Specifically, at the multimedia data distributor device, there is further provided an extraction step of extracting the ID number which is embedded as electronic watermark information in the electronic data indicating the multimedia data to be distributed, the attribute information transmitting step transmits, in a case where the ID number is extracted at the extraction step from the electronic data indicating the multimedia data to be distributed, the ID number in addition to the attribute information of the electronic data indicating the multimedia data to be distributed, to the ID issuing center side device, and transmits, in a case where the ID number is not extracted from the electronic data indicating the multimedia data to be distributed, the attribute information of the electronic data indicating the multimedia data to be distributed, to the ID issuing center, the watermark information embedding step embeds, in a case where the additional ID number is transmitted from the ID issuing center, the additional ID number, as a bit string starting from the next bit of the bit string of the ID number extracted at the extraction step, in the electronic data indicating the multimedia data to be distributed.

In this case, the retrieval step is not required at the ID issuing center. However, at the ID issuing center, the ID number generating step generates, in a case where only the attribute information are transmitted from the multimedia data distributor, the unique basic number, which is not registered yet in the database registered with the ID number already issued by the ID issuing center in a manner to correspond to the attribute information, as the ID number, and registers the basic number as the ID number in the database in a manner to correspond to the attribute information transmitted from the distributor of the multimedia data, and generates, in a case where the attribute information and the ID number are transmitted from the multimedia data distributor, the additional number so that the number obtained by attaching the additional number to the ID number may be the unique number not registered in the database, after it is confirmed that the ID number is registered in the database, and registers the number, which has been obtained by attaching the additional number to the ID number, as the ID number in the database in a manner to correspond to the attribute information transmitted from the multimedia data distributor.

According to a second embodiment of the present invention, there is provided a method for distributing multimedia data as electronic data to a purchaser of the multimedia data in a multimedia data distribution system including an ID issuing center and a multimedia data distributor side device, comprising:

at the multimedia data distributor side device:

a bit number information extracts step of extracting a bit number information embedded in electronic data indicating the multimedia data to be distributed, by a predetermined electronic watermarking method;

an attribute information transmitting step of transmitting, in a case where the bit number information extracting step has failed to extract the bit number information from the electronic data indicating the multimedia data to be distributed, the attribute information of the multimedia data to be distributed, to the ID issuing center;

a first watermark information embedding step of embedding a basic ID number transmitted from the ID issuing center side device in response to the attribute information transmitting step, as a watermark information in the electronic data indicating the multimedia data to be distributed, and embedding the bit number information of the embedded basic ID number in the electronic data by the predetermined electronic watermarking method;

an additional ID number generating step of generating, in a case where the bit number information are extracted at the bit number information extracting step from the electronic data indicating the multimedia data to be distributed, an additional ID number and registering the additional ID number in an additional ID number database in a manner to correspond to the attribute information of the multimedia data to be distributed;

a second watermark information embedding step of embedding the additional ID number generated at the additional ID number generating step, as a bit string starting from the next bit of a bit string specified by the bit number information extracted at the bit number information extracting step, in the electronic data indicating the multimedia data to be distributed, and updating the bit number information embedded in the electronic data indicating the multimedia data to be distributed, by using the predetermined electronic watermarking method; and a distribution step of distributing the electronic data indicating the multimedia data, in which the basic or additional ID number is embedded as the watermark information at the first or second watermark information embedding step, to the purchaser of the multimedia data, and at the ID issuing center;

a basic ID number generating step of generating a basic ID number in response to the attribute information transmitted from the multimedia data distributor, and registering the basic ID number in a basic ID number database in a manner to correspond to the attribute information; and a basic ID number transmitting step of transmitting the basic ID number, as generated at the basic ID number generating step, to the multimedia data distributor.

Here, the attribute information includes information capable of specifying the title, author, distributor and purchaser of the multimedia data.

On the other hand, the aforementioned bit number information may be either information indicating the total bit number (or bit length) of the basic ID number or additional ID number embedded in the electronic data indicating the multimedia data, or, in a case where the bit length of the basic ID number or additional ID number is constant, information indicating the number of times, at which the basic ID number or additional ID number is embedded in the electronic data indicating the multimedia data.

According to the present embodiment, the distributor of the multimedia data examines whether or not the bit number information of the ID number embedded in the electronic data indicating the multimedia data to be distributed are embedded in the electronic data. In a case where the information is not embedded, it is thought that the multimedia data are distributed at first on the market. In this case, the attribute information of the multimedia data is transmitted to the ID issuing center. In response to this, the ID issuing center generates and registers the basic ID number in the basic ID number database in a manner to correspond to the attribute information transmitted from the distributor of the multimedia data. Then, the basic ID number is transmitted to the distributor of the multimedia data.

In a case where the information is embedded, on the other hand, it is thought that the multimedia data to be distributed have already been distributed on the market and are copied and distributed again (so that the ID number is already embedded in the electronic data indicating the multimedia data to be distributed). In this case, the distributor of the multimedia data generates and registers the additional ID number in the additional ID number database in a manner to correspond to the attribute information of the multimedia data.

The distributor of the multimedia data embeds, In a case where the basic ID number is transmitted from the ID issuing center, the basic ID number as the watermark information in the electronic data indicating the multimedia data to be transmitted, and embeds the bit number information of the embedded basic ID number in the electronic data by the predetermined electronic watermarking method. In a case where the distributor himself of the multimedia data issues the additional ID number, on the other hand, the additional ID number is embedded, as the bit string starting from the next bit of the bit string specified by the bit number information extracted from the electronic data indicating the multimedia data to be distributed, in the electronic data, and the bit number information embedded in the electronic data are updated by using the predetermined electronic watermarking method.

With the construction thus far described, according to the present embodiment, the unique ID numbers can be given to the individual multimedia data appearing on the market, so that the multimedia data having the ID numbers embedded therein can be verified by extracting the ID numbers embedded from the multimedia data and by retrieving the basic ID number database of the ID issuing center or the additional ID number database of the distributor of the multimedia data. According to the present embodiment, on the other hand, even in a case where the once distributed multimedia data are copied and distributed again, the additional ID numbers succeeding to the basic ID numbers embedded in the original multimedia data are embedded in the copied data. As a result, what distribution route the multimedia data are distributed on can be grasped by retrieving the basic ID number database or the additional ID number database.

Here in the present embodiment, an ID verifying center side device may be provided, and the multimedia data distributing method may further comprise, at the ID verifying center side device, a verification step of extracting the ID number from the electronic data indicating the multimedia data, in which the ID number is embedded as the watermark information, to verify the multimedia data by retrieving the attribute information corresponding to the ID number with the basic ID number database and the additional ID number database.

In the present embodiment, on the other hand, the first watermark information embedding step may embed the watermarking method specifying information for specifying the electronic watermarking method, as used when the basic ID number transmitted by the ID issuing center to the electronic data indicating the multimedia data to be distributed, in the electronic data by the predetermined electronic watermarking method, and the second watermark information embedding step may extract the watermarking method specifying information from the electronic data indicating the multimedia data to be distributed, by the predetermined electronic watermarking method, to embed the additional ID number in the electronic data by using the electronic watermarking method specified by the extracted watermarking method specifying information.

Thus, the distributor who first embed the ID number in the multimedia data can embed the ID number with the desired electronic watermarking method.

These and other benefits are described throughout the present specification. A further understanding of the nature and advantages of the invention may be realized by reference to the remaining portions of the specification and the attached drawings.

BRIEF DESCRIPTION OF THE DRAWINGS

FIGS. 14A and 14B are diagrams for explaining the ID numbers and the attribute information, as registered in an ID number database 41;

DETAILED DESCRIPTION OF THE PREFERRED EMBODIMENTS

Here will be described a first embodiment of the present invention.

Figure 1:
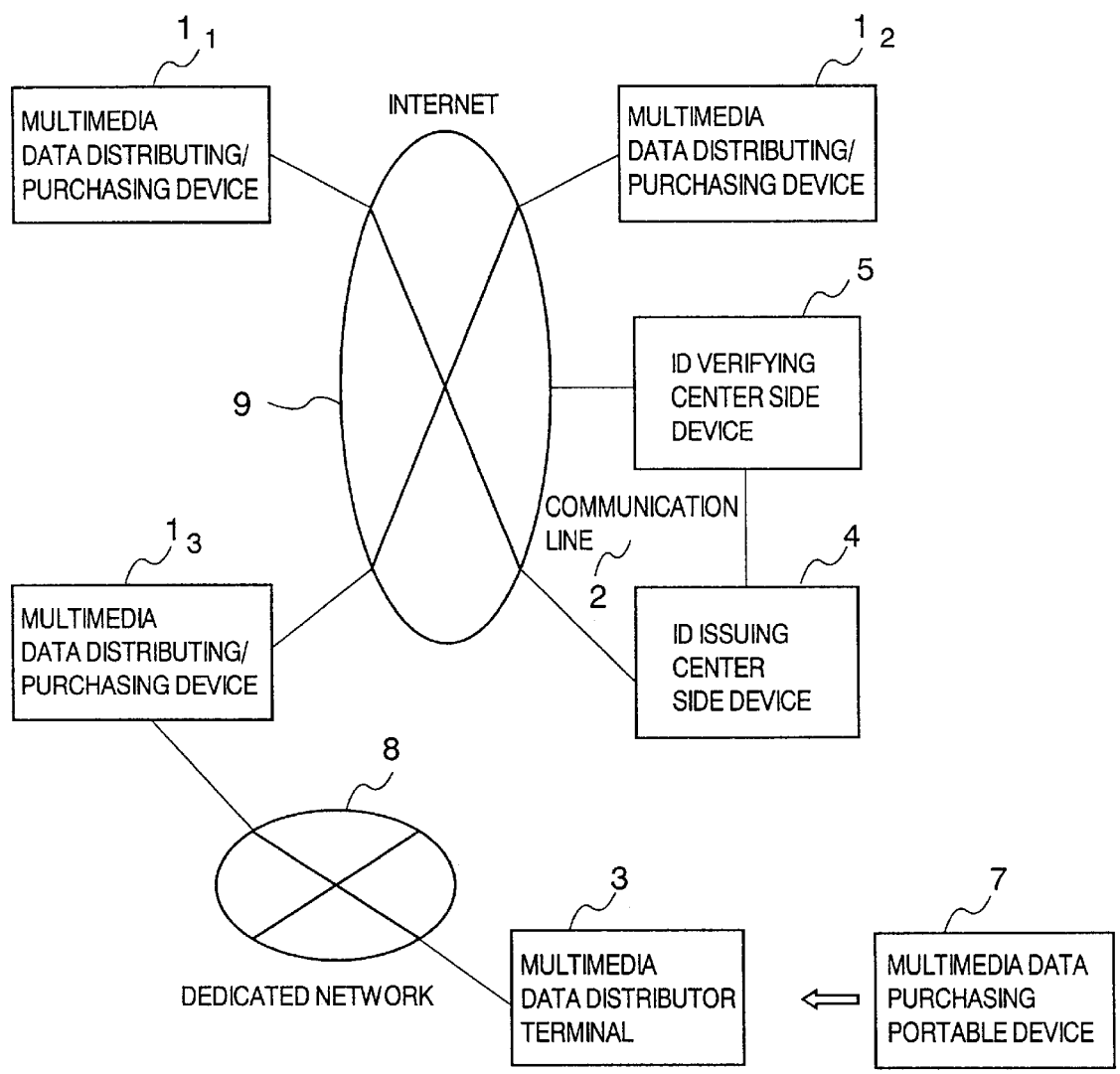
FIG. 1 is a diagram for schematically explaining a multimedia data distribution system to which a first embodiment of the present invention is applied.

FIG. 1 is a diagram for schematically explaining a multimedia data distribution system to which a first embodiment of the present invention is applied.

As shown, the multimedia data distribution system of this embodiment is constructed such that a plurality of multimedia data distributing/purchasing devices $1_1$ to $1_3$, an ID issuing center side device 4 and an ID verifying center side device 5 are connected with one another through an Internet 9. In addition, the multimedia data distributing/purchasing device $1_3$ is connected through a dedicated network 8 such as an on-line system with a multimedia data distributor terminal 3 which can mount a multimedia data purchasing portable device 7. Moreover, the ID verifying center side device 5 is connected through a dedicated communication line 2 with the ID issuing center side device 4.

In the multimedia data distribution system thus constructed, let a case be considered, in which a user of the multimedia data distributing/purchasing device $1_3$ purchases the multimedia data (which is assumed to have never come into the market) provided by the multimedia data distributing/purchasing devices $1_1$ and $1_2$.

Figure 2:
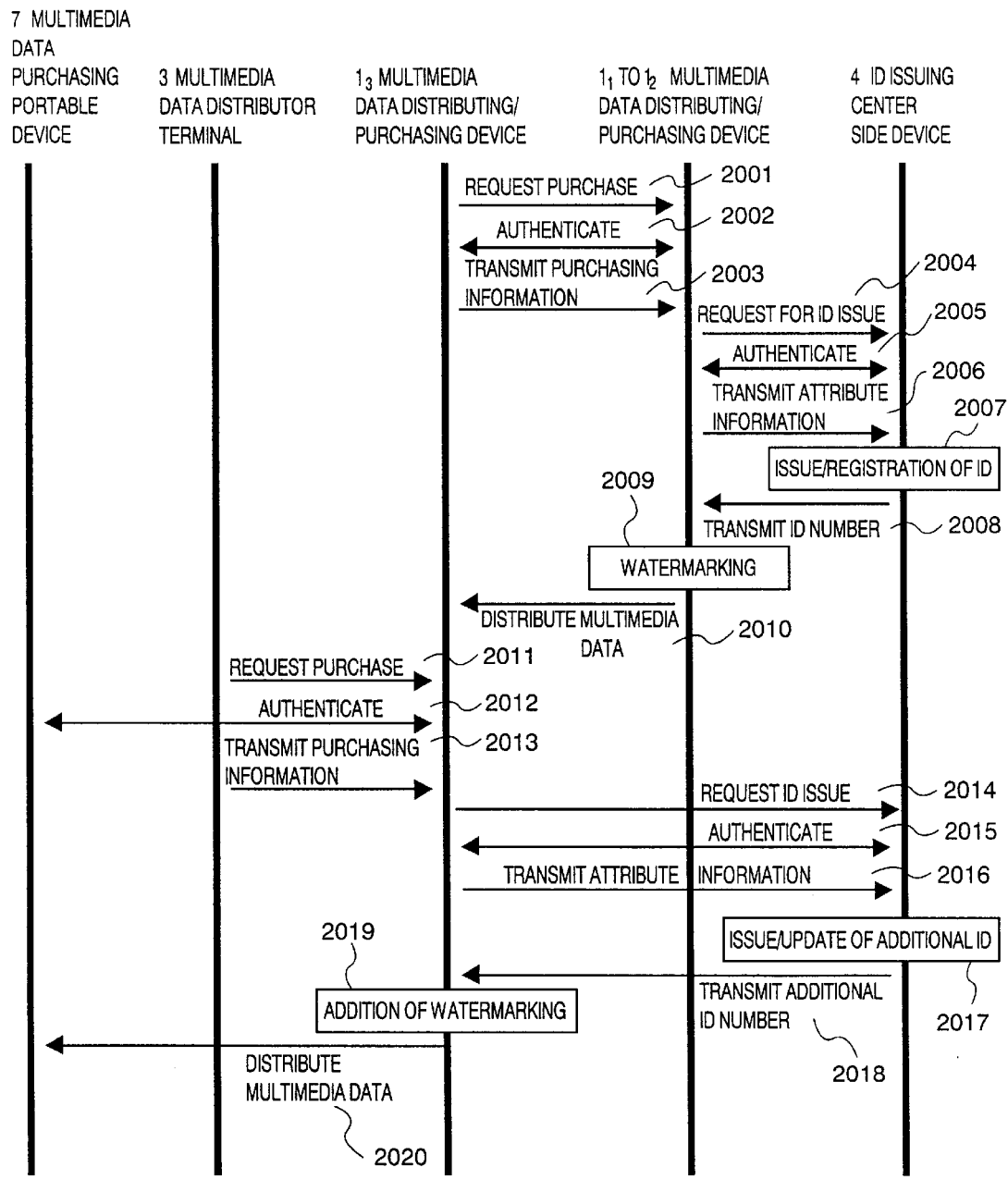
FIG. 2 is a diagram showing the transfers of data among individual devices of the multimedia data distribution system shown in FIG. 1.

As shown in FIG. 2, the multimedia data distributing/purchasing device $1_3$ is used: to transmit a purchasing request to the multimedia data distributing/purchasing device $1_1$ or $1_2$ (at 2001); to authenticate with each other (at 2002); and to transmit the information on the purchaser himself, the title of the multimedia data to be purchased, and the information of the author (at 2003).

The multimedia data distributing/purchasing device $1_1$ and $1_2$ having received the information on the purchaser, the title of the multimedia data to be purchased and the information on the author from the multimedia data distributing/purchasing device $1_3$: transmit an ID issuing request to the ID issuing center side device 4 (at 2004); authenticate with each other (at 2005); and transmit the information on the purchaser, the title of the multimedia data to be purchased and the information on the author, as received from the multimedia data distributing/purchasing device $1_3$, and attribute information containing the information on the distributor himself (at 2006).

The ID issuing center side device 4 having received the attribute information from the multimedia data distributing/purchasing devices $1_1$ and $1_2$ retrieves, from an ID number database in which ID numbers having been issued by the ID issuing center are registered to correspond to the attribute information, whether or not the attribute information transmitted by the multimedia data distributing/purchasing devices $1_1$ and $1_2$ are coincide with the title and author of the multimedia, and whether or not the attribute information indicating that the distributor thereof is the purchaser are registered. Here, it is assumed that the multimedia data provided by the multimedia data distributing/purchasing devices $1_1$ and $1_2$ have never come into the market. Therefore, the attribute information transmitted by the multimedia data distributing/purchasing devices $1_1$ and $1_2$ are coincident with the title and author of the multimedia data, and the attribute information indicating that the distributor thereof is the purchaser cannot be registered in the ID number database yet. In this case, the ID issuing center side device 4 issues a unique basic number not registered in the ID number database, and registers the basic number as the ID number in the database in a manner to correspond to the attribute information transmitted by the multimedia data distributing/purchasing devices $1_1$ and $1_2$ (at 2007). Then, the issued basic number is transmitted as the ID number to the multimedia data distributing/purchasing devices $1_1$ and $1_2$ having transmitted the attribute information (at 2008).

The multimedia data distributing/purchasing devices $1_1$ and $1_2$ having received the ID number from the ID issuing center side device 4 copies the electronic data (as will also be called the "multimedia data") of the multimedia data to be purchased, as requested to be purchased by the purchaser, from their own multimedia data database, and embeds the ID number received from the ID issuing center side device 4, as electronic watermark information in the copied multimedia data. Then, the information used to embed the ID number in the multimedia data and indicating the electronic watermarking method are embedded as the meta-information in the multimedia data by using the electronic watermarking method which has been determined in advance with the ID verifying center side device 5 (at 2009). The multimedia data thus having the ID number and the meta-information embedded therein are transmitted to the multimedia data distributing/purchasing device $1_3$ (at 2010). This multimedia data distributing/purchasing device $1_3$ receives the multimedia data to be purchased, as transmitted from the multimedia data distributing/purchasing devices $1_1$ and $1_2$, and stores them in its own multimedia data database.

Let a case be considered, in which the multimedia data thus acquired by the multimedia data distributing/purchasing device $1_3$ are purchased by the user of the multimedia data purchasing portable device 7.

The multimedia data purchasing portable device 7 is mounted on the multimedia data distributor terminal 3. As shown in FIG. 2, this multimedia data distributor terminal 3 is used: to transmit a purchasing request to the multimedia data distributing/purchasing device $1_3$ (at 2011); to authenticate between the multimedia data purchasing portable device 7 and the multimedia data distributing/purchasing device $1_3$ (at 2012) with each other; and to transmit the information on the purchaser himself and the information on the title and author of the multimedia data to be purchased (at 2013).

The multimedia data distributing/purchasing device $1_3$ having received the information on the purchaser and the information on the title and author of the multimedia data to be purchased, from the multimedia data distributor terminal 3: transmits a request for issuing an ID to the ID issuing center side device 4 (at 2014); mutually authenticates with the ID issuing center side device 4 (at 2015); and then transmits the attribute information containing the information, as received from the multimedia data distributor terminal 3, on the purchaser and the title and author of the multimedia data to be purchased, and the information on the purchaser himself (at 2016).

The ID issuing center side device 4 having received the attribute information from the multimedia data distributing/purchasing device $1_3$ retrieves, from the ID number database of the ID issuing center side device 4, whether or not the attribute information transmitted by the multimedia data distributing/purchasing device $1_3$ are coincide with the title and author of the multimedia data and whether or not the attribute information indicating that the distributor of the attribute information is the purchaser is registered. Here, the multimedia data provided by the multimedia data distributing/purchasing device $1_3$ is the one which is purchased from the multimedia data distributing/purchasing devices $1_1$ and $1_2$ so that the attribute information transmitted by the multimedia data distributing/purchasing device $1_3$ is coincident with the title and author of the multimedia data and the attribute information indicating that the distributor of the attribute information is the purchaser must have already been registered in the ID number database. In this case, the ID issuing center side device 4: generates an additional number so that the attribute information transmitted by the multimedia data distributing/purchasing device $1_3$ and the title and author of the multimedia data may coincide and so that the number obtained by attaching the additional number to the ID number corresponding to the attribute information indicating that the distributor of the attribute information is the purchaser may be a unique number which is not registered in the ID number database; and registers the number obtained by attaching the additional number to the ID number, as the ID number in the database in a manner to correspond to the attribute information transmitted by the multimedia data distributing/ purchasing device $1_3$ (at 2017). Then, the issued additional number is transmitted as the additional ID number together with the bit number information of the original ID number attached by the additional number, to the multimedia data distributing/purchasing device $1_3$ (at 2018). Here, the bit number information may be those indicating a total bit number (or bit length) of the original ID number indicated in the ID number database. In a case where the basic number or the additional number is made of a predetermined bit number so that the original ID number indicated in the ID number database is expressed by a multiple of the predetermined bit length, the bit number information may be those indicating that multiple.

The multimedia data distributing/purchasing device $1_3$ having received the ID number from the ID issuing center side device 4 copies the multimedia data for the purchaser to request for its purchasing, from its own database. Moreover, the multimedia data distributing/purchasing device $1_3$ uses the electronic watermarking method which has been determined in advance with the ID verifying center side device 5, to extract the meta-information from the copied multimedia data, and uses the electronic watermarking method specified by the extracted meta-information, to embed the additional ID number received from the ID issuing center side device 4 (at 2019).

At this time, the additional ID number is embedded, as the bit string starting from a bit next to the bit string specified by the bit number information transmitted together with the additional ID number, in the copied multimedia data. Thus, the multimedia data having the additional ID number embedded therein are transmitted through the multimedia data distributor terminal 3 to the multimedia data purchasing portable device 7 (at 2020).

In a case where the attribute information are to be verified by extracting the ID number from the multimedia data in which the ID number and the meta-information are embedded, as described above, the multimedia data are brought, either through the Internet 9 or after having been recorded in a recording medium such as a CD-ROM or an FD, to the ID verifying center side device 5. In response to the multimedia data, the ID verifying center side device 5 extracts the meta-information from the multimedia data by using the electronic watermarking method which has been determined in advance with the individual multimedia data distributor/purchasing devices $1_1$ to $1_3$. After this, the ID verifying center side device 5 uses the electronic watermarking method specified by the extracted meta-information, to extract the ID number (which is either the basic number or a number consisting the basic number and the additional number attached thereto) from the multimedia data. Next, the ID verifying center side device 5 retrieves the ID number database of the ID issuing center side device 4 through the dedicated communication line or the Internet 9, to verify the attribute information corresponding to the ID number.

Here will be the individual devices constructing the multimedia data distribution system thus far described.

Here will be described multimedia data distributing/ purchasing devices $1_1$ to $1_3$.

Figure 3:
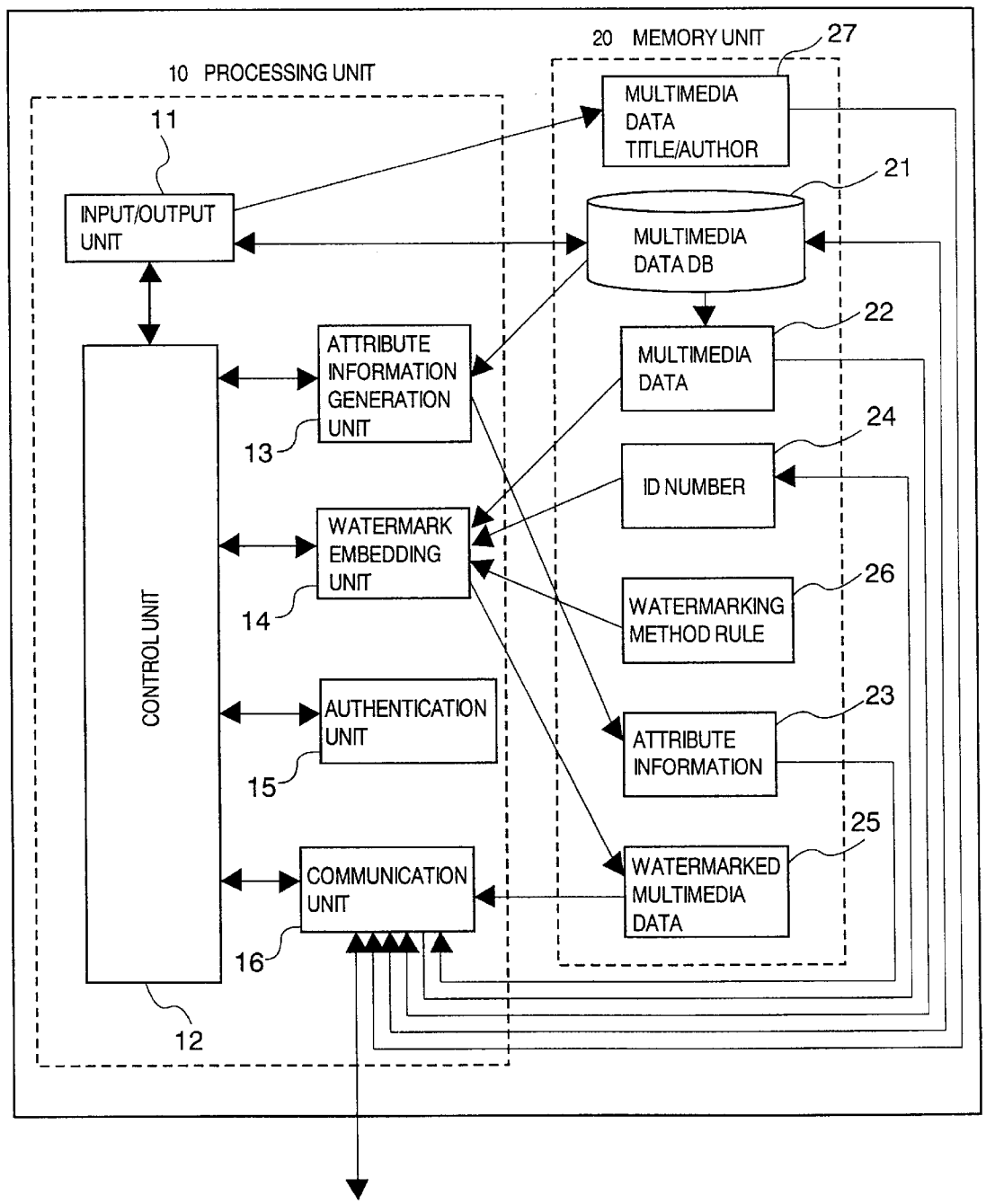
FIG. 3 is a schematic construction diagram of multimedia data distributor side $1_1$ to $1_3$ devices shown in FIG. 1.

FIG. 3 is a schematic construction diagram of the multimedia data distributing/purchasing devices $1_1$ to $1_3$.

As shown, the multimedia data distributing/purchasing devices $1_1$ to $1_3$ is constructed to include a processing unit 10 and a storage unit 20.

The processing unit 10 is constructed to include: an input/output unit 11 for inputting/outputting information such as multimedia data, e.g., books or musics, and the title and author of the multimedia data, which are indicated by the multimedia data; a control unit 12 for generally controlling the individual units of the multimedia data distributing/ purchasing devices $1_1$ to $1_3$; an attribute information generation unit 13; a watermark embedding unit 14; an authentication unit 15; and a communication unit 16 for making communications with other devices through the Internet 9 or the dedicated network 8.

The storage unit 20 is constructed to include: a multimedia data database for storing the multimedia data inputted through the input/output unit 11 or the communication unit 16, in a manner to correspond the information to the title and author of the multimedia data; a multimedia data holding unit 22 for holding the multimedia data to be purchased by the purchaser; an attribute information holding unit 23 for holding the attribute information generated by the attribute information generation unit 13; an ID number holding unit 24 for holding an ID number or an additional ID number (in a case of the additional number, it contains bit number information indicating the bit number of the ID number already embedded in the multimedia data to be purchased) transmitted from the ID issuing center side device 4; a watermarked multimedia data holding unit 25 for holding the watermarked multimedia data in which the ID number, the additional ID number and the meta-information are embedded; a watermarking method rule storage unit 26 for storing an algorithm of an electronic watermarking method to be used for each of the multimedia data distributing/ purchasing devices $1_1$ to $1_3$ to embed the ID number or the additional ID number in the multimedia data; and a multimedia data title/author information holding unit 27 for holding the information to specify the multimedia data to be purchased such as the title and author of the multimedia data inputted to the input/output unit 11.

The attribute information generation unit 13 generates attribute information containing: information on the title and author of the multimedia data made to correspond to the multimedia data to be purchased, as held in the multimedia data holding unit 22; information on the purchaser of the multimedia data to be purchased; and information of the distributor (i.e., the owner himself of the multimedia data distributing/purchasing devices $1_1$ to $1_3$) of the multimedia data to be purchased.

The watermark embedding unit 14 embeds the ID number or the additional ID number held in the ID number holding unit 24, as the watermark information in the multimedia data to be purchased, which is held in the multimedia data holding unit 22. In a case where the ID number is held in the ID number holding unit 24, it is embedded in the multimedia data to be purchased, which is held in the multimedia data holding unit 22, and the information indicating the electronic watermarking method determined in advance with the ID verifying center side device 5 are embedded in the multimedia data to be purchased, by using the electronic watermarking method (which exerts no influence on the extraction of the ID number embedded in the multimedia data) determined in advance with the ID verifying center side device 5. In a case where the information on the additional ID number and the bit number are held in the ID number holding unit 24, on the other hand, the electronic watermarking method determined in advance with the ID verifying center side device 5 is used to extract the meta-information from the multimedia data to be purchased, and the algorithm of the electronic watermarking method specified by the extracted meta-information is read out from the watermarking method rule storage unit 26. In accordance with the read algorithm, moreover, the additional ID number is embedded as a bit string starting from the next bit of the bit string specified by the bit number information, in the multimedia data to be purchased without influencing the ID number already embedded in the multimedia data to be purchased.

Prior to the communications with other devices through the communication units 16, the authentication unit 15 performs mutual authentications with the other devices. As the authentication method, there have been proposed a variety of methods, which can be applied to the mutual authentications in the present embodiment. For example, the authentication method by the challenge-and-response can be applied to the mutual authentication of the present embodiment. Here, this method by the challenge-and-response authenticates the partner in the following procedure. To the owner of a secret key, more specifically, a random number is sent by someone having a public key paired with that secret key. The owner of the secret key encrypts the received random number by using his own secret key, and returns the cipher text to the sender of the random number. The owner of the public key paired with the secret key encodes the received cipher text with his own public key. If a result of the encoding is the random number he sends, it is proved that the sender of the cipher text is the person owning the secret key paired with his own public key. In this embodiment, the multimedia data distributing/purchasing devices $1_1$ to $1_3$ are made to own the public key paired with the secret key owned by the valid communication partner device, and the valid communication partner device is made to own the public key paired with the secret key owned by the multimedia data distributing/purchasing devices $1_1$ to $1_3$. Then, it is possible to perform the mutual authentications using the challenge-and-response method.

Here will be described the ID issuing center side device 4.

Figure 4:
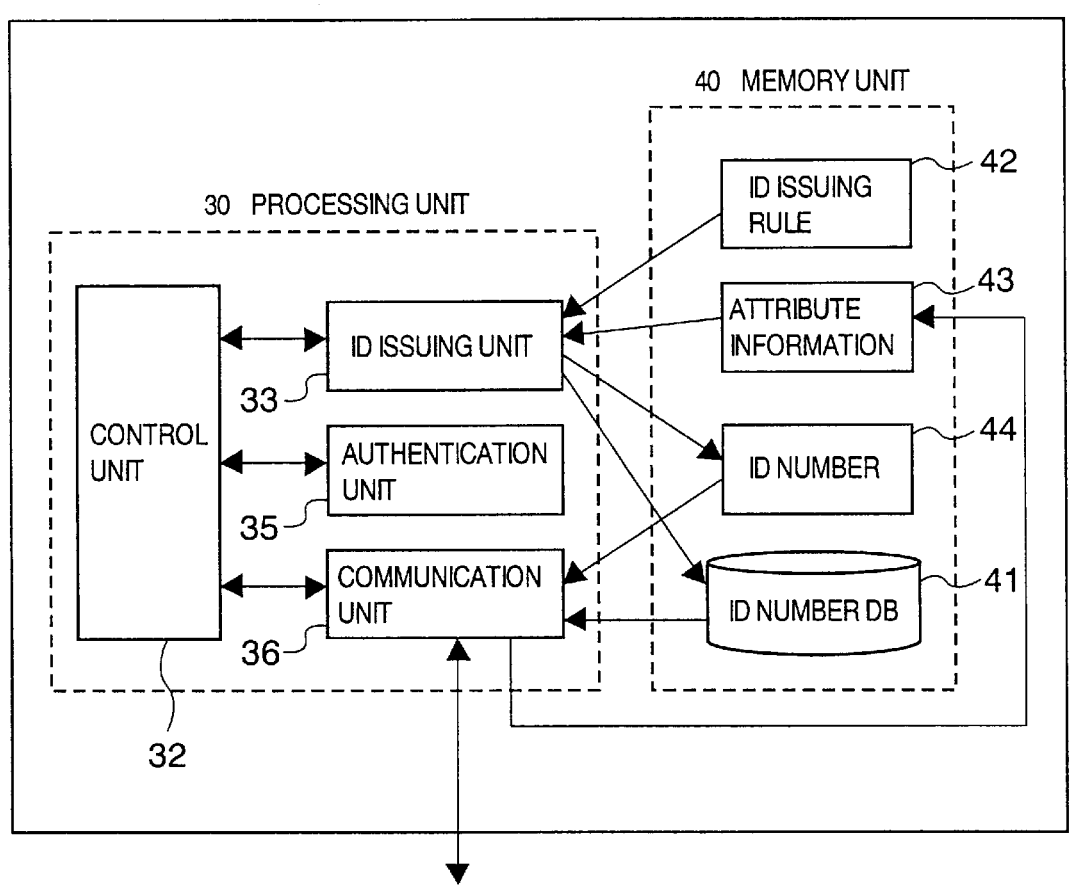
FIG. 4 is a schematic construction diagram of an ID issuing center side device 4 shown in FIG. 1.

FIG. 4 is a schematic construction diagram of the ID issuing center side device 4.

As shown, the ID issuing center side device 4 is constructed to include a processing unit 30 and a storage unit 40.

The processing unit 30 is constructed to include: a control unit 32 for generally controlling the individual units of the ID issuing center side device 4; an ID issuing unit 33 for issuing the ID number or the additional ID number in response to a request for issuing an ID from the multimedia data distributing/purchasing devices $1_1$ to $1_3$; a communication unit 36 for making communications with other devices through the Internet 9 or the dedicated communication line 2; and an authentication unit 35 for performing the mutual authentications with other devices prior to the communications with the other devices through the communication unit 36.

The storage unit 40 is constructed to include: an ID issuing rule storage unit 42 for storing the rule to be used by the ID issuing unit 33 to issue the ID number and the additional ID number; an attribute information holding unit 43 for holding the attribute information sent from the multimedia data distributing/purchasing devices $1_1$ to $1_3$; an ID number holding unit 44 for holding the ID number or the additional ID number (containing the bit number information in a case of the additional ID number) issued by the ID issuing unit 33; and an ID number database 41 for registering the ID number, as already issued by the ID issuing center, in a manner to correspond to the attribute information.

The ID issuing unit 33 examines whether or not the attribute information held in the attribute information holding unit 43 and the title and author of the multimedia data are coincident and whether or not the attribute information indicating that the distributor of the attribute information is the purchaser is registered in the ID number database 41.

In a case where the result is that the attribute information held in the attribute information holding unit 43 and the title and author of the multimedia data are coincident and that the attribute information indicating that the distributor of the attribute information is the purchaser is not registered, a unique basic number, which is not registered in the ID number database 4, is generated so that it is registered as the ID number in the ID number database 41 in a manner to correspond to the attribute information held in the attribute information holding unit 43 and is stored in the ID number holding unit 44.

On the other hand, in a case where the attribute information held in the attribute information holding unit 43 and the title and author of the multimedia data are coincident and In a case where the attribute information indicating that the distributor of the attribute information is the purchaser is already registered, an additional number is generated so that the number to be achieved by attaching the additional number to the ID number corresponding to the already registered attribute information may be the unique number which is not registered in the ID number database 41. Moreover, the number which is achieved by attaching the additional number to that ID number is registered as the ID number in the ID number database 41 in a manner to correspond to the attribute information held in the attribute information holding unit 43. On the other hand, the generated additional number is stored as the additional ID number together with the bit number information indicating the bit number of the original ID number (of the case In a case where the attribute information held in the attribute information holding unit 43 and the title and author of the multimedia data are coincident and In a case where the attribute information indicating that the distributor of the attribute information is the purchaser is made to correspond to the ID number) attached to the additional number in the ID number holding unit 44.

Here will be described the ID verifying center side device 5.

Figure 5:
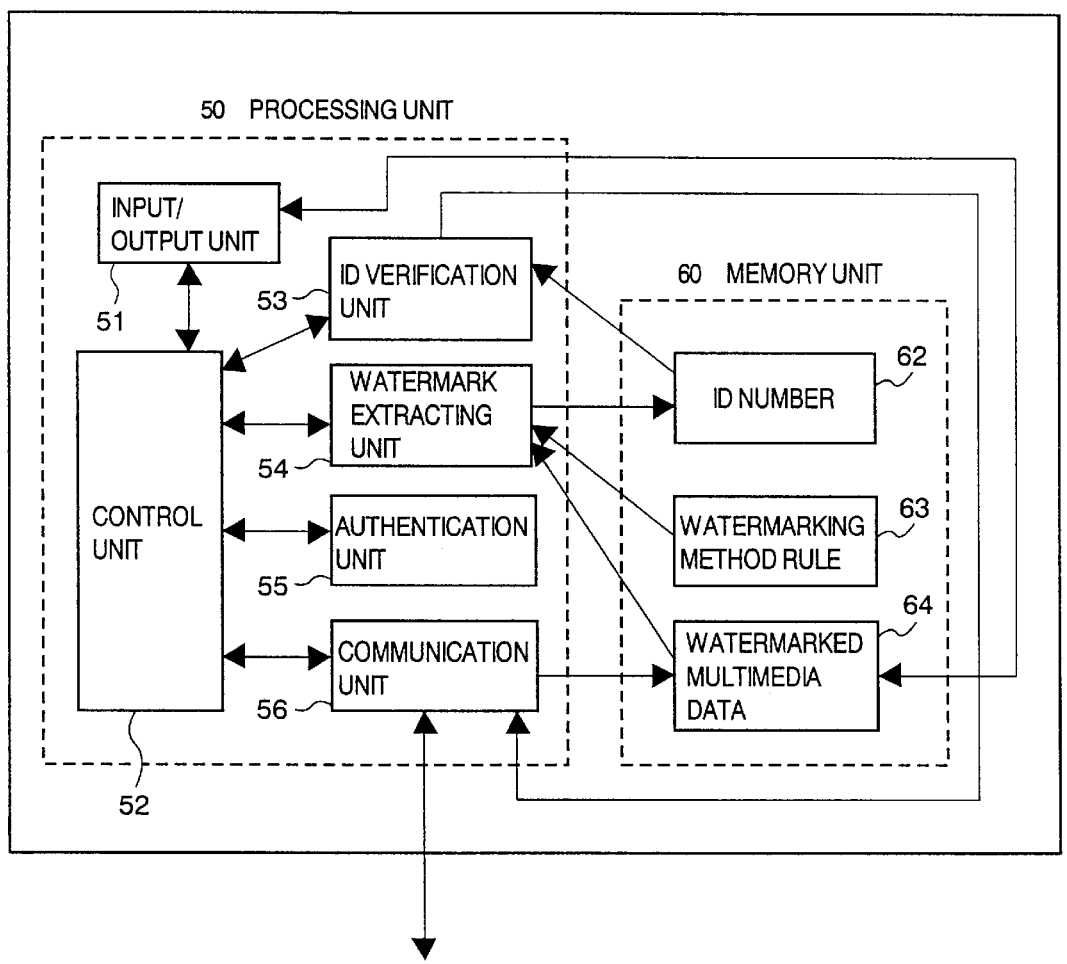
FIG. 5 is a schematic construction diagram of an ID verifying center side device 5 shown in FIG. 1.

FIG. 5 is a schematic construction diagram of the ID verifying center side device 5.

As shown, the ID verifying center side device 5 is constructed to include a processing unit 50 and a storage unit 60.

The processing unit 50 is constructed to include: an input/output unit 51 in charge of the inputting/outputting of the verified result of the watermarked multimedia data of the ID number to be verified or the ID number; a control unit 52 for generally controlling the individual units of the ID verifying center side device 5; an ID verification unit 53; a watermark extracting unit 54 for extracting the ID number from the watermarked multimedia data; a communication unit 56 for making communications with other devices through the Internet 9 or the dedicated communication line 2; and an authentication unit 55 for performing mutual authentications with other devices prior to the communications with the other devices through the communication unit 56.

The storage unit 60 is constructed to include: a watermarking method rule storage unit 63 for storing the algorithm of the electronic watermarking method to be used for embedding the ID number in the multimedia data in each of the multimedia data distributing/purchasing devices $1_1$ to $1_3$; an ID number holding unit 62 for holding the ID number extracted by the watermark extracting unit 54; and and a watermarked multimedia data holding unit 64 for holding the watermarked multimedia data inputted through the input/output unit 51 or the communication unit 56.

The watermark extracting unit 54 uses the electronic watermarking method determined in advance with the multimedia data distributing/purchasing devices $1_1$ to $1_3$, to extract the meta-information from the watermarked multimedia data held in the watermarked multimedia data holding unit 64. Moreover, the algorithm of the electronic watermarking method indicated by the extracted meta-information is read from the watermarking method rule storage unit 63 so that the ID number is extracted from the watermarked multimedia data in accordance with the read algorithm.

The ID verification unit 53 accesses to the ID number database 41 of the ID issuing center side device 4 through the communication unit 56 and the dedicated communication line 2 or the Internet 9 and examines the attribute information corresponding to the ID number held in the ID number holding unit 62, to verify the author, purchaser or distributor of the multimedia data to which the ID number is given. On the other hand, the attribute information, which are coincident in the title and the author to the multimedia data indicated by the attribute information corresponding to the ID number and making the distributor and the purchaser common, are retrieved from the ID number database 41, to verify what communication route the multimedia data to which the ID number is given are distributed on.

Here will be described the multimedia data distributor terminal 3 and the multimedia data purchasing portable device 7.

Figure 6:
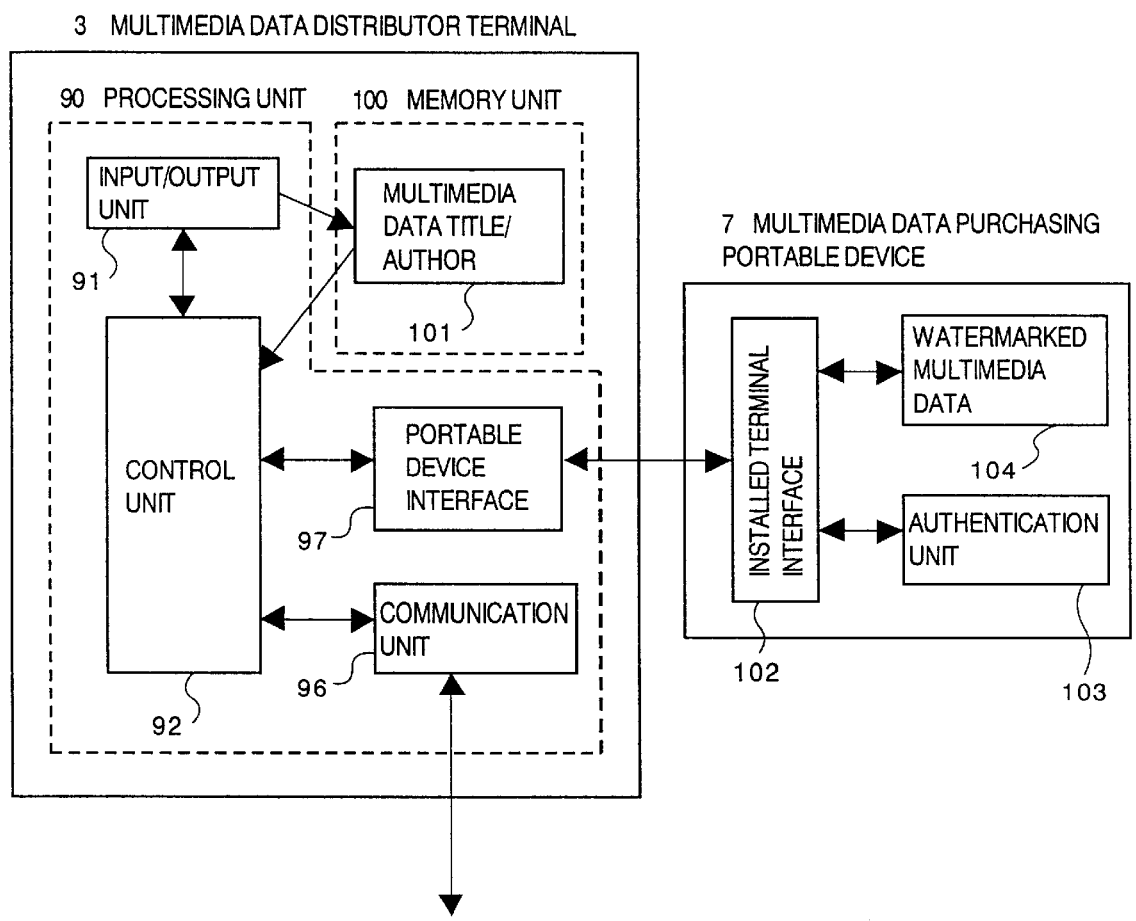
FIG. 6 is a schematic construction diagram of a multimedia data distributor terminal 3 and a multimedia data purchasing portable device 7, as shown in FIG. 1.

FIG. 6 is a schematic construction diagram showing the multimedia data distributor terminal 3 and the multimedia data purchasing portable device 7.

As shown, the multimedia data distributor terminal 3 is constructed to include a processing unit 90 and a storage unit 100. The processing unit 90 is constructed to include: an input/output unit 91 in charge of the inputting and so on of the information to specify the multimedia data to be purchased, such as the title and author of the multimedia data; a portable device interface unit 97 in charge of the transfers of data with the multimedia data purchasing portable device 7; a communication unit 96 in charge of the communications with other devices through the dedicated network 8; and a control unit 92 for generally controlling the individual units of the multimedia data distributor terminal 3 and the individual units of the multimedia data purchasing portable device 7 connected with the portable device interface unit 97. The storage unit 100 is constructed include a multimedia data title/author information holding unit 101 for holding the information to specify the multimedia data to be purchased, such as the title and author of the multimedia data inputted to the input/output unit 91.

On the other hand, the multimedia data purchasing portable device 7 is constructed to include: an installed terminal interface unit 102 in charge of the transfers of the data with the multimedia data distributor terminal 3; an authentication unit 103 for performing the mutual authentications with other devices before the multimedia data distributor terminal 3 connected with the installed terminal interface unit 102 communicates with the other devices; and a watermarked multimedia data holding unit 104 for holding the watermarked multimedia data which are distributed from the multimedia data distributor terminal 3 through the multimedia data distributor terminal 3 connected with the installed terminal interface unit 102.

Figure 7:
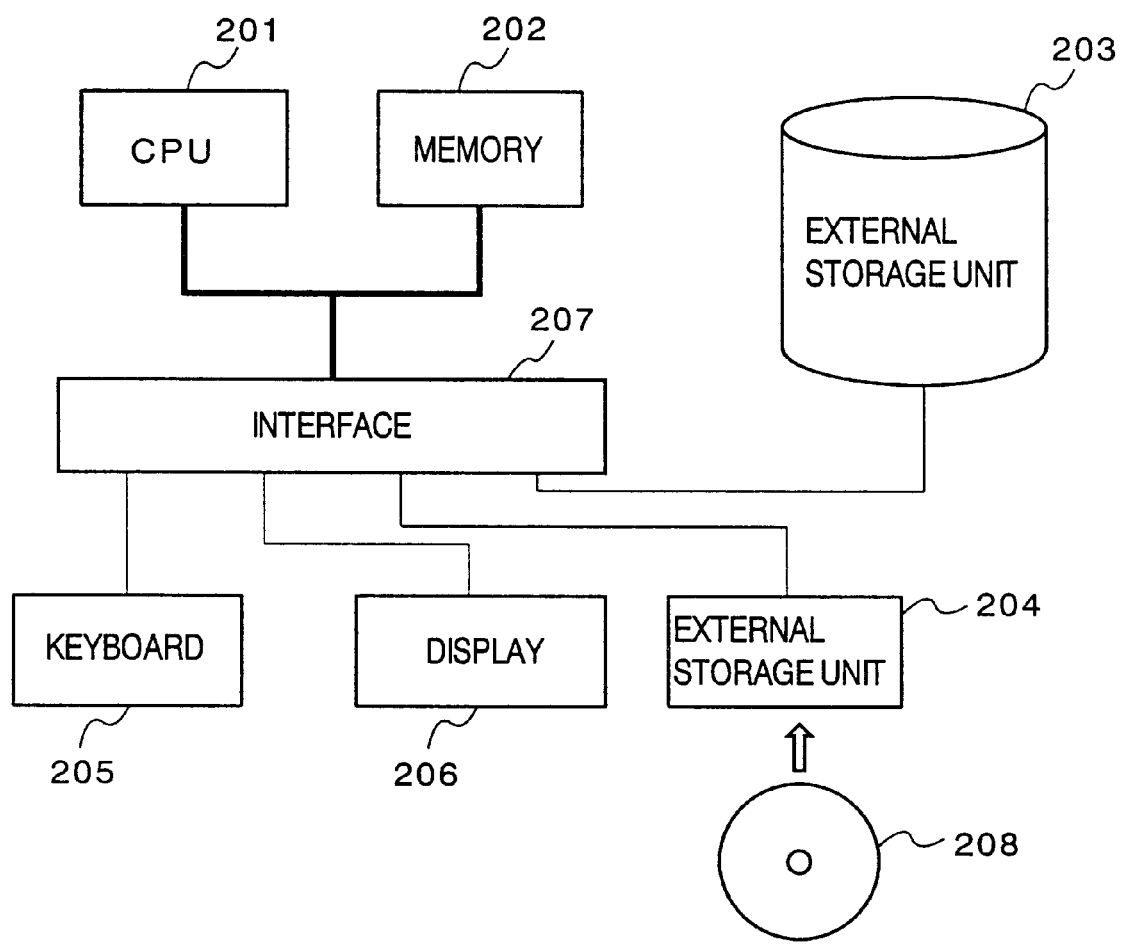
FIG. 7 is a diagram showing one example of a hardware construction of the multimedia data distributor side devices $1_1$ to $1_3$, the ID issuing center side device 4, the ID verifying center side device 5 or the multimedia data distributor terminal 3, as shown in FIG. 1.

Here, each of the multimedia data distributing/purchasing devices 11 to 13, the ID issuing center side device 4, the ID verifying center side device 5 and the multimedia data distributor terminal 3 thus far described can be installed over an information processing device having a general construction including: a CPU 201; a memory 202; an external storage unit 203 such as a hard disk device; another external storage unit 204; an input device 205 such as a keyboard; an output device 206 such as a display; and an interface 207 with the external storage unit or an input/output device, as shown in FIG. 7. Here, the processing units 10, 30, 50 and 90 of these individual devices are realized as processes to be embodied over the information processing device when the CPU 201 executes the programs (which may also be called the "codes" or "modules") loaded over the memory 202. In this case, the memory 202 and the external memory devices 203 and 204 are employed as the storage units 20, 40, 60 and 100.

The aforementioned programs for embodying the multimedia data distributing/purchasing devices $1_1$ to $1_3$, the ID issuing center side device 4, the ID verifying center side device 5 and the multimedia data distributor terminal 3 over the information processing device when executed by the CPU 201 are stored in advance in the external memory device 203 so that they are loaded, if necessary, over the memory 202 and executed by the CPU 201. Here, the aforementioned programs: may be loaded in a portable memory medium 208, or, if necessary, over the memory 202 through the external memory device 204 handling the CD-ROM from the portable memory medium 208; may be loaded over the memory 202 from the external memory device 203, if necessary, after once installed in the external memory device 203 from the portable memory medium 208 through the external memory device 204; may be loaded over the memory 202 after once downloaded with a carrier wave being a kind of a computer readable medium over the network in the external memory device 203 through the not-shown network connection device; or may be directly loaded over the memory 202 through the network.

Figure 8:
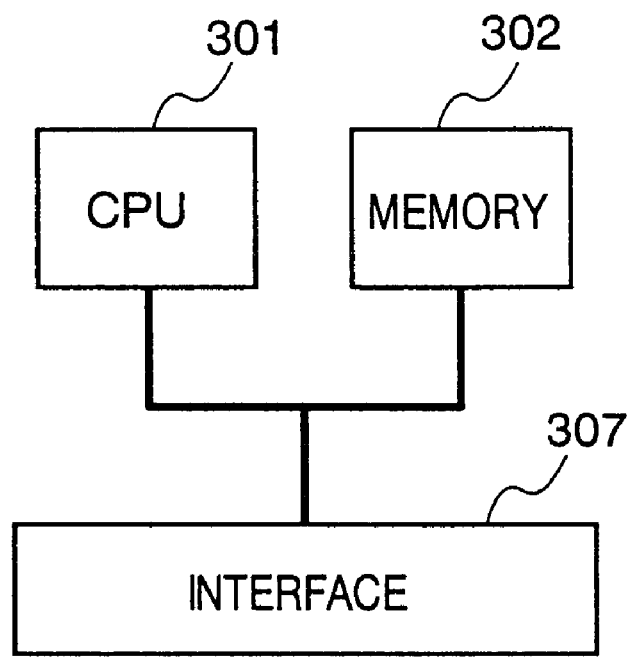
FIG. 8 is a diagram showing one example of the hardware construction of the multimedia data purchasing portable device 7 shown in FIG. 1.

On the other hand, the aforementioned multimedia data purchasing portable device 7 may be constructed over a memory medium with computing functions such as an IC card, which is constructed to include a CPU 301, a memory 302 and an interface 307 with an external device, as shown in FIG. 8. Here, the authentication unit 103 of the aforementioned device is realized as the processes which are embodied over the memory medium having the computing functions when the CPU 301 executes the programs loaded over the memory 302. In this case, the memory 302 is employed as the watermarked multimedia data holding unit 104. The multimedia data handled in the present invention is embodied on memory 202, 302 of each device or an external storage unit 203, or a carrier wave on the network.

Here will be described operation of the individual devices of the multimedia data distribution system thus constructed.

Here will be described the multimedia data distributing/purchasing devices $1_1$ to $1_3$.

Figure 9:
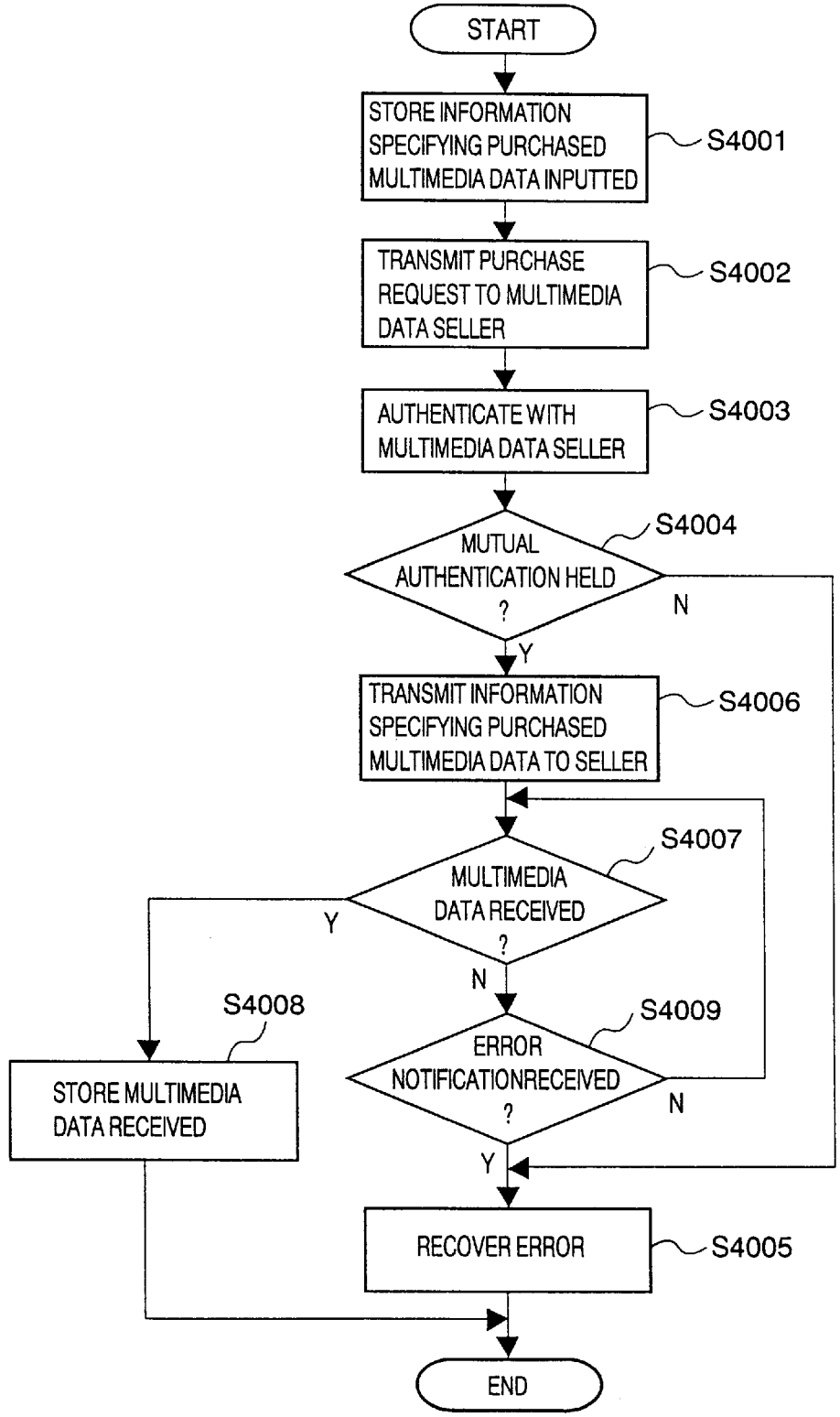
FIG. 9 is a flow chart showing operation of a case where the multimedia data distributor devices $1_1$ to $1_3$ shown in FIG. 1 purchase multimedia data.

FIG. 9 is a flow chart showing operation of the multimedia data distributing/purchasing devices $1_1$ to $1_3$ of a case in which the multimedia data distributing/purchasing devices $1_1$ to $1_3$ purchase the multimedia data from other multimedia data distributing/purchasing devices $1_1$ to $1_3$. This flow is started when a user of the multimedia data distributing/purchasing devices $1_1$ to $1_3$ designates the title and author of the multimedia data to be purchased, to the multimedia data distributing/purchasing devices $1_1$ to $1_3$ thereby to instruct a request for purchasing the multimedia data seller (or the other multimedia data distributing/purchasing devices $1_1$ to $1_3$).

The input/output unit 11 stores the information specifying the multimedia data to be purchased such as the title and author of the multimedia data received by the user, in the multimedia data title/author information holding unit 27 (at Step S4001). The authentication unit 15 transmits a purchase request to the multimedia data seller through the communication unit 16 and the Internet 9 (at Step S4002), and authenticates with the multimedia data seller (at Step S4003). In a case where the result is that the mutual authentication is not completed (at Step S4004), a predetermined error recovery is performed (at Step S4005) by informing the user that the multimedia data cannot be purchased. In a case where the mutual authentication is held (at Step S4004), on the other hand, the communication unit 16 reads out the information specifying the multimedia data to be purchased from the multimedia data title/author information holding unit 27 and the information specifying the multimedia data purchaser (i.e., the user of the multimedia data distributing/purchasing devices $1_1$ to $1_3$) stored in advance in the storage unit 20, from the storage unit 20, and transmits the information to the multimedia data seller through the Internet 9 (at Step S4006). At this time, in a case where the information to be transmitted contains those to be kept secret from a third party, cipher communications may be made by using the cryptographic method which has been determined in advance with the multimedia data seller, for example.

After this, the communication unit 26 awaits that the multimedia data having the watermarked data embedded therein are transmitted from the multimedia data seller through the Internet 9 (at Step S4007), and stores the watermarked multimedia data received in the multimedia data database 21 in a manner to correspond to the attribute information held in the attribute information holding unit 23 (at Step S4008). Here, In a case where the error information is received from the multimedia data seller through the Internet 9 (at Step S4009), the predetermined error recovery is made by informing the user that the multimedia data cannot be purchased (at Step S4005).

Figure 10:
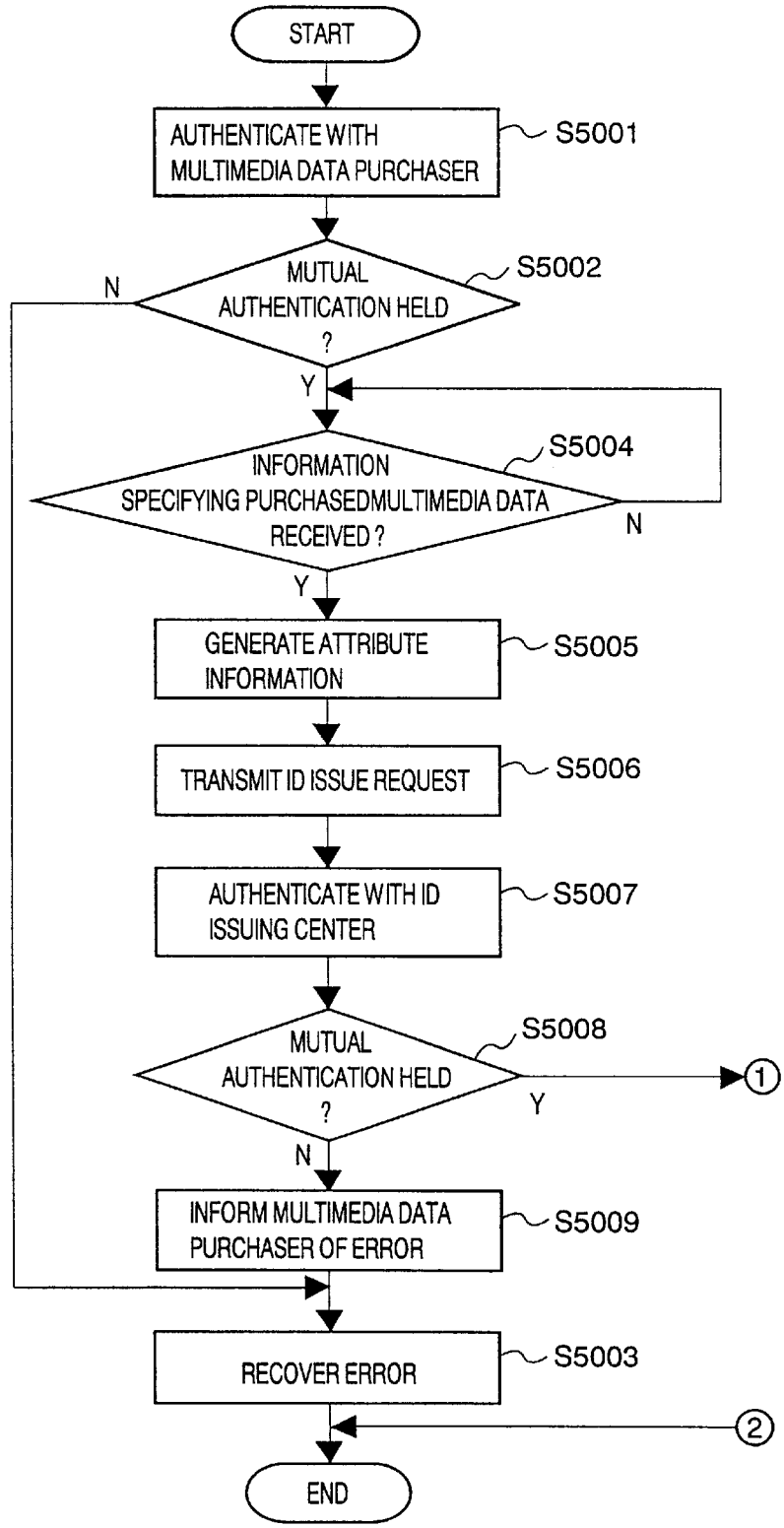
FIG. 10 is a flow chart showing operation of a case where the multimedia data distributor devices $1_1$ to $1_3$ shown in FIG. 1 distribute multimedia data.
Figure 11:
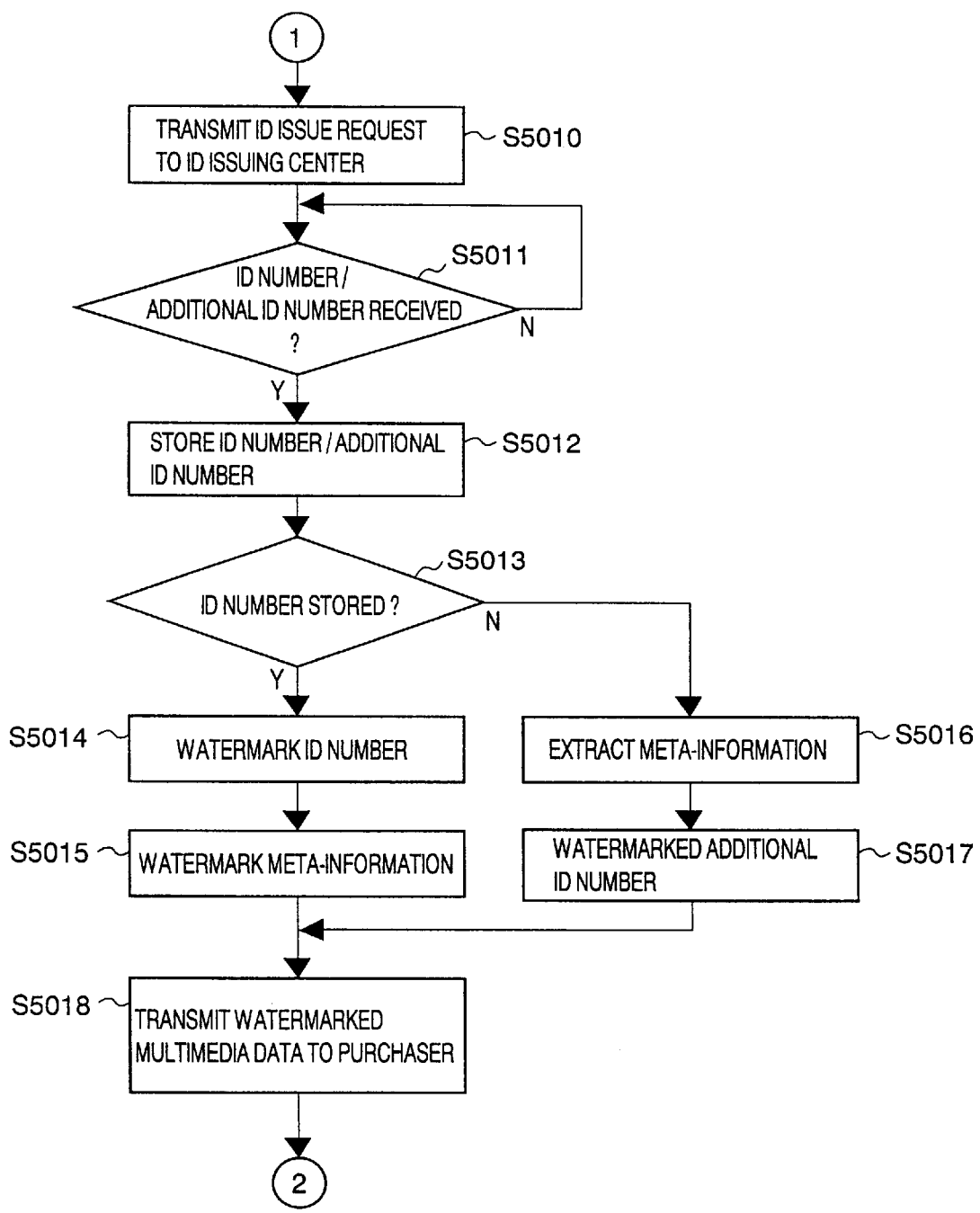
FIG. 11 is a flow chart showing operation of a case where the multimedia data distributor devices $1_1$ to $1_3$ shown in FIG. 1 distribute multimedia data.

FIGS. 10 and 11 are a flow chart showing operation of the multimedia data distributing/purchasing devices $1_1$ to $1_3$, In a case where the multimedia data distributing/purchasing devices $1_1$ to $1_3$ distribute the multimedia data to the other multimedia data distributing/purchasing devices $1_1$ to $1_3$. This flow is started when there is received the purchase request transmitted from the multimedia data purchaser (i.e., the other multimedia data distributing/purchasing devices $1_1$ to $1_3$).

The authentication unit 15 authenticates with the multimedia data purchaser (at Step S5001) when the purchase request is sent from the multimedia data purchaser. In a case where the result is that the mutual authentication is not completed (at Step S5002), a predetermined error recovery is made (at Step S5003).

In a case where the mutual authentication is completed (at Step S5002), on the other hand, the attribute information generation unit 13 awaits the receptions of the information specifying the multimedia data to be purchased such as the title and author of the multimedia data and the information specifying the multimedia data purchaser, from the multimedia data purchaser through the communication unit 16 and the Internet 9 (at Step S5004). The attribute information generation unit 13 reads out the information, as stored in advance in the storage unit 20 to specify the multimedia data distributor (i.e., the owner of the multimedia data distributing/purchasing devices $1_1$ to $1_3$), from the storage unit 20, and generates and stores the attribute information containing those information, the information specifying the multimedia data to be purchased such as the title and author of the multimedia data and the information specifying the multimedia data purchaser, in the attribute information holding unit 23 (at Step S5005).

The authentication unit 15 transmits the ID issue request to the ID issuing center side device 4 through the communication unit 16 and the Internet 9 (at Step S5006), and authenticates with the ID issuing center side device 4 (at Step S5007).

In a case where the result is that the mutual authentication is not completed (at Step S5008), the authentication unit 15 transmits the error information to the multimedia data purchaser through the communication unit 16 and the Internet 9 (at Step S5009), and then performs the predetermined error recovery (at Step S5003).

In a case where the mutual authentication is completed (at Step S5008), on the other hand, the authentication unit 15 read outs the attribute information stored in the attribute information holding unit 23, and transmits the attribute information to the ID issuing center side device 4 through the communication unit 16 and the Internet 9 (at Step S5010). At this time, in a case where the information to be transmitted contains those to be kept secret from the third party, the cipher communications may be made by using the cryptographic method which has been determined in advance with the ID issuing center device 4, for example.

After this, the communication unit 16 awaits the ID number or the additional ID number from the ID issuing center side device 4 through the Internet 9 (at Step S5011), and stores the received ID number or additional ID number in the ID number holding unit 24 (at Step S5012). Here, in a case where the additional ID number is to be stored, there are also stored the bit number information which are sent together with the additional ID number from the ID issuing center side device 4.

The watermark embedding unit 14 retrieves the multimedia data database 21, and copes and stores the multimedia data, which are made to correspond to the information specifying the multimedia data to be purchased, as contained in the attribute information stored in the attribute information holding unit 23, in the multimedia data holding unit 22. In the multimedia data stored in the multimedia data holding unit 22, the ID number or the additional ID number stored in the ID number holding unit 24 Is then embedded as the watermark information.

Specifically, in a case where the number stored in the ID number holding unit 24 is the ID number (at Step S5013), the watermark embedding unit 14 embeds the ID number stored in the ID number holding unit 24, as the watermark information in the multimedia data stored in the multimedia data holding unit 22 (at Step S5014). Next, the watermark embedding unit 14 uses the electronic watermarking method, as determined in advance with the ID verifying center side device 5, to embed the information indicating the electronic watermarking method used for embedding the ID number in the multimedia data, as the meta-information in the contents data having that ID number embedded therein (at Step S5015). Then, the multimedia data, in which the ID number and the meta-information are embedded in the aforementioned manners, are stored in the watermarked multimedia data holding unit 25.

On the other hand, in a case where the number stored in the ID number holding unit 24 is the additional ID number (at Step S5013), the watermark embedding unit 14 uses the electronic watermarking method, as has been determined in advance with the ID verifying center side device 5, to extract the meta-information from the multimedia data stored in the multimedia data holding unit 22 and to read out the algorithm of the electronic watermarking method specified by the extracted meta-information, from the watermarking method rule storing unit 26 (at Step S5016). Next, in accordance with the read algorithm, the additional ID number stored in the ID number holding unit 24 is embedded as the bit string, as started from the next bit of the bit string specified by the bit number informationtored in the ID number holding unit 24, in the multimedia data stored in the multimedia data holding unit 22 (at Step S5017). Thus, the ID number having already been embedded in the multimedia data is prevented from being influenced. Then, the multimedia data having the additional ID number embedded therein are stored in the watermarked multimedia data holding unit 25.

The communication unit 16 transmits the watermarked multimedia data, as stored in the watermarked multimedia data holding unit 25, to the multimedia data purchaser through the Internet 9 (at Step S5018).

Here will be described the ID issuing center side device 4.

Figure 12:
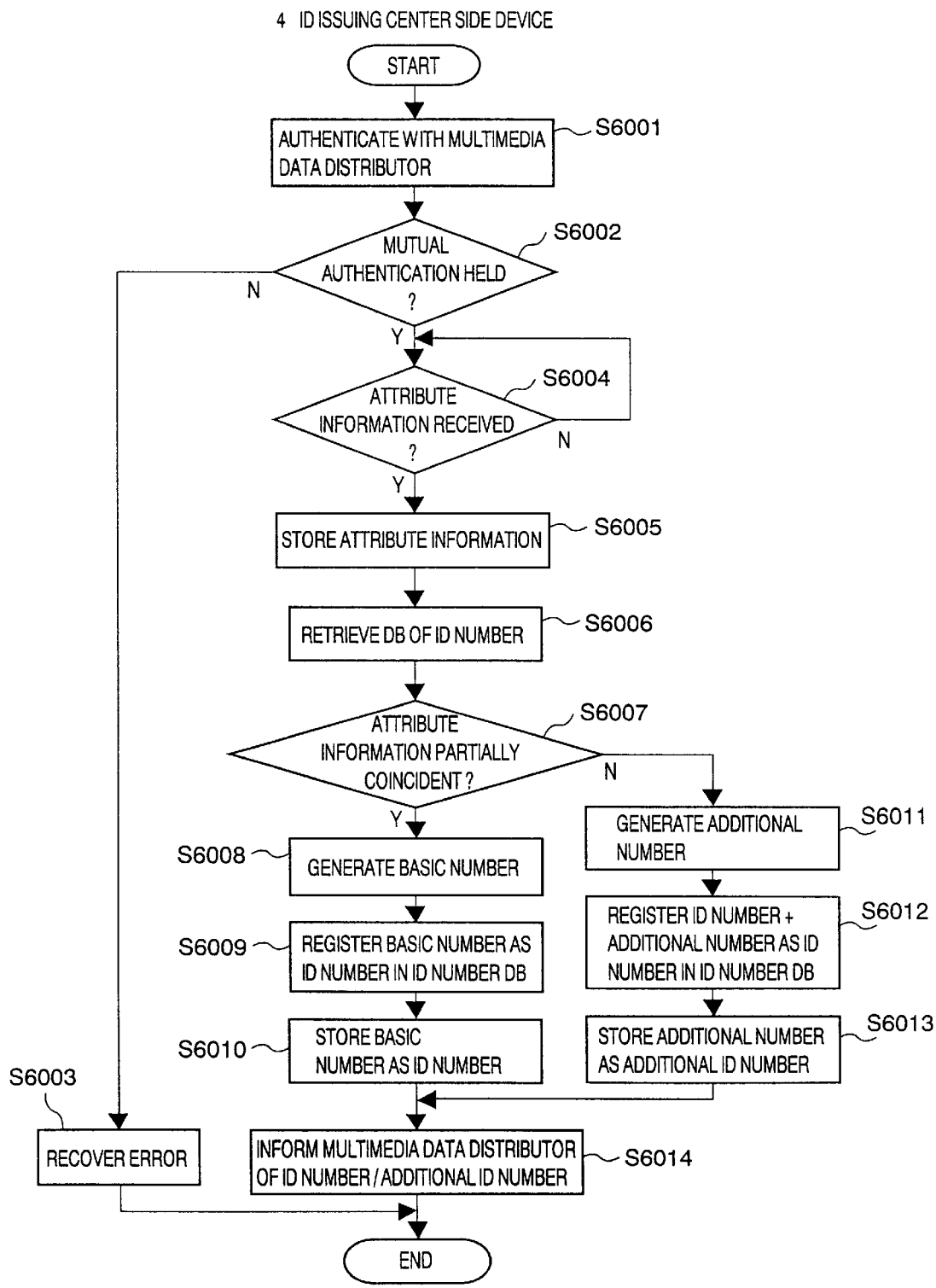
FIG. 12 is a flow chart showing operation of the ID issuing center side device 4 shown in FIG. 1.

FIG. 12 is a flow chart showing operation of the ID issuing center side device 4. This flow is started when the ID issue request transmitted from the multimedia data distributing/purchasing devices $1_1$ to $1_3$ is received.

When the ID issue request is sent from the multimedia data distributor (or the multimedia data distributing/purchasing devices $1_1$ to $1_3$) through the communication unit 36 and the Internet 9, the authentication unit 35 authenticates with the multimedia data distributor (at Step S6001). In a case where the result is that the mutual authentication is not completed (at Step S6002), a predetermined error recovery is performed (at Step S6003). When the mutual authentication is completed (at Step S6002), on the other hand, the communication unit 36 awaits the reception of the attribute information from the multimedia data distributor through the Internet 9 (at Step S6004) and stores the received attribute information in the attribute information holding unit 43 (at Step S6005).

The ID issuing unit 33 reads out the attribute information stored in the attribute information holding unit 43, and examines whether or not the attribute information and the title and author of the multimedia data are coincident and whether or not the attribute information indicating that the distributor of the attribute information is the purchaser is registered in the ID number database 41 (at Step S6006).

In a case where the result is that the attribute information held in the attribute information holding unit 43 and the title and author of the multimedia data are coincident and that the attribute information indicating that the distributor of the attribute information is the purchaser is not registered yet (at Step S6007), a unique basic number, which is not registered in the ID number database 41, is generated (at Step S6008) in accordance with the rule which is stored in the ID issuing rule storage unit 42, and is stored as the ID number in the ID number database 41 in a manner to correspond to the attribute information stored in the attribute information holding unit 43 (at Step S6009). In addition, the basic number is stored as the ID number in the ID number holding unit 44 (at Step S6010).

On the other hand, in a case where the attribute information held in the attribute information holding unit 43 and the title and author of the multimedia data are coincident and In a case where the attribute information indicating that the distributor of the attribute information is the purchaser is already registered (at Step S6007), an additional number is so generated (at Step S6011) in accordance with the rule stored in the ID issuing rule storage unit 42 that the number by attaching the additional number to the ID number corresponding to the already registered attribute information may be the unique number which is not registered in the ID number database 41. Moreover, the number, which has been obtained by attaching the additional number to the ID number, is registered as the ID number in the ID number database 41 in a manner to correspond to the attribute information held in the attribute information holding unit (at Step S6012). On the other hand, the generated additional number is stored as the additional ID number in the ID number holding unit 44 (at Step S6013) together with bit number information indicating the bit number of the original ID number (i.e., the ID number corresponding to the attribute information held in the attribute information holding unit 43 and the title and author of the multimedia data are coincident and indicating that the distributor of the attribute information is the purchaser) to which the additional number is attached.

The communication unit 36 transmits either the ID number or the additional ID number stored in the ID number holding unit 44 and the bit number information to the multimedia data distributor through the Internet 9 (at Step S6014).

Here, the rule for generating the basic number to be stored in the ID issuing rule storage unit 42 may be any if it can generate a number, which is not stored yet as the ID number in the ID number database 41, as the basic number for the attribute information read out from the attribute information holding unit 43. However, the ID number can be highly efficiently registered in the ID number database 41, for example, by generating the basic number in accordance with the following rule.

Figure 13:
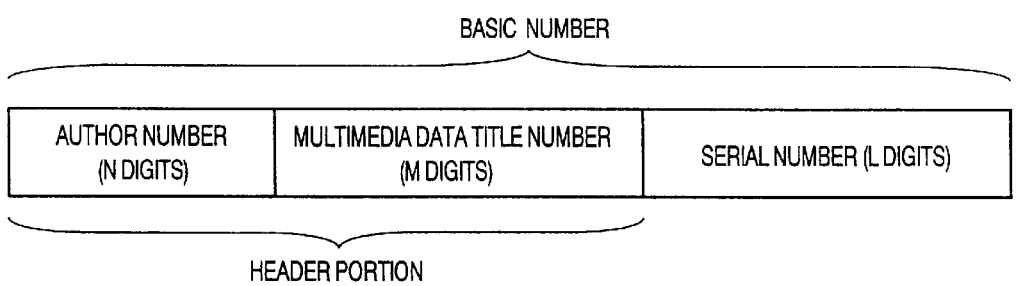
FIG. 13 is a diagram for explaining the issuing rules of ID numbers (or basic numbers)

For the information to specify the multimedia data such as the author and title of the multimedia data, more specifically, numbers of predetermined digits are assigned in advance to those information, as shown in FIG. 13, and are stored in the ID issuing rule storage unit 42. Moreover, the numbers, which is assigned individually to the author and title of the multimedia data contained in the attribute information read from the attribute information holding unit 43 are read out from the ID issuing rule storage unit 42 and attached in a predetermined sequence (e.g., the sequence of the author→the title of the multimedia data) to generate the header portion of the basic number, so that the basic number is generated by giving that header portion the serial number which is issued to each of identical numbers. In other words, the basic number is generated by retrieving the ID number equal to the number of the generated header portion from the ID number database 41, and by generating the serial number to be given to the number of the generated header portion, from the number having the largest serial number implemented by 1. The basic number thus generated is registered as the ID number in the ID number database 41.

FIGS. 14A and 14B show the ID numbers and the attribute information which are registered in the ID number database 41. FIG. 14A shows the registered multimedia data in the ID number database 41 of a case in which the numbers, which is not stored yet as the ID numbers in the ID number database, are merely set as the basic numbers for the attribute information read from the attribute informationtoring unit 43. Here, the attribute information corresponding to the individual ID numbers are exemplified by the information thought to be necessary for specifying the multimedia data, such as the information specifying the author and the title of the multimedia data, the information specifying the multimedia data distributor, and the information specifying the multimedia data purchaser. Here, in a case where predetermined codes are assigned at the ID issuing center to the author, the title, the distributor and the purchaser of the multimedia data, the codes may be used as the individual information to correspond to the ID numbers.

On the other hand, FIG. 14B shows the registered data in the ID number database 41 with regard to the information for specifying the author and the title of the multimedia data, in a case where the numbers of predetermined digits are assigned in advance to those information, as shown in FIG. 13, and are stored in the ID issuing rule storage unit 42, and in a case where the numbers, as assigned individually to the author and title contained in the attribute information read from the attribute information holding unit 43 are read out from the ID issuing rule storage unit 42 and attached in a predetermined sequence to generate the header portion of the basic number, so that the basic number is generated by giving that header portion the serial number which is issued to each of identical numbers. In this case, if the basic number, i.e., the header portion of the ID number is examined, the author and the title of the multimedia data corresponding to that ID number can be specified. Therefore, the information specifying the author and the title of the multimedia data need not be contained as the attribute information to correspond to the ID numbers so that the ID numbers can be highly efficiently registered in the ID number database 41.

Here in FIGS. 14A and 14B, the entry ID numbers, as designated by numerals 401 and 402, are constructed by attaching the additional numbers to the basic numbers. This construction indicates that the multimedia data having the ID numbers are once distributed and copied and are distributed again. On the other hand, the entry ID numbers designated by numerals 403 to 405 are constructed of only the basic numbers. This construction indicates that the multimedia data having the ID numbers are distributed only once.

Here will be described operation of the multimedia data purchasing portable device 7 and the multimedia data distributor terminal 3.

Figure 15:
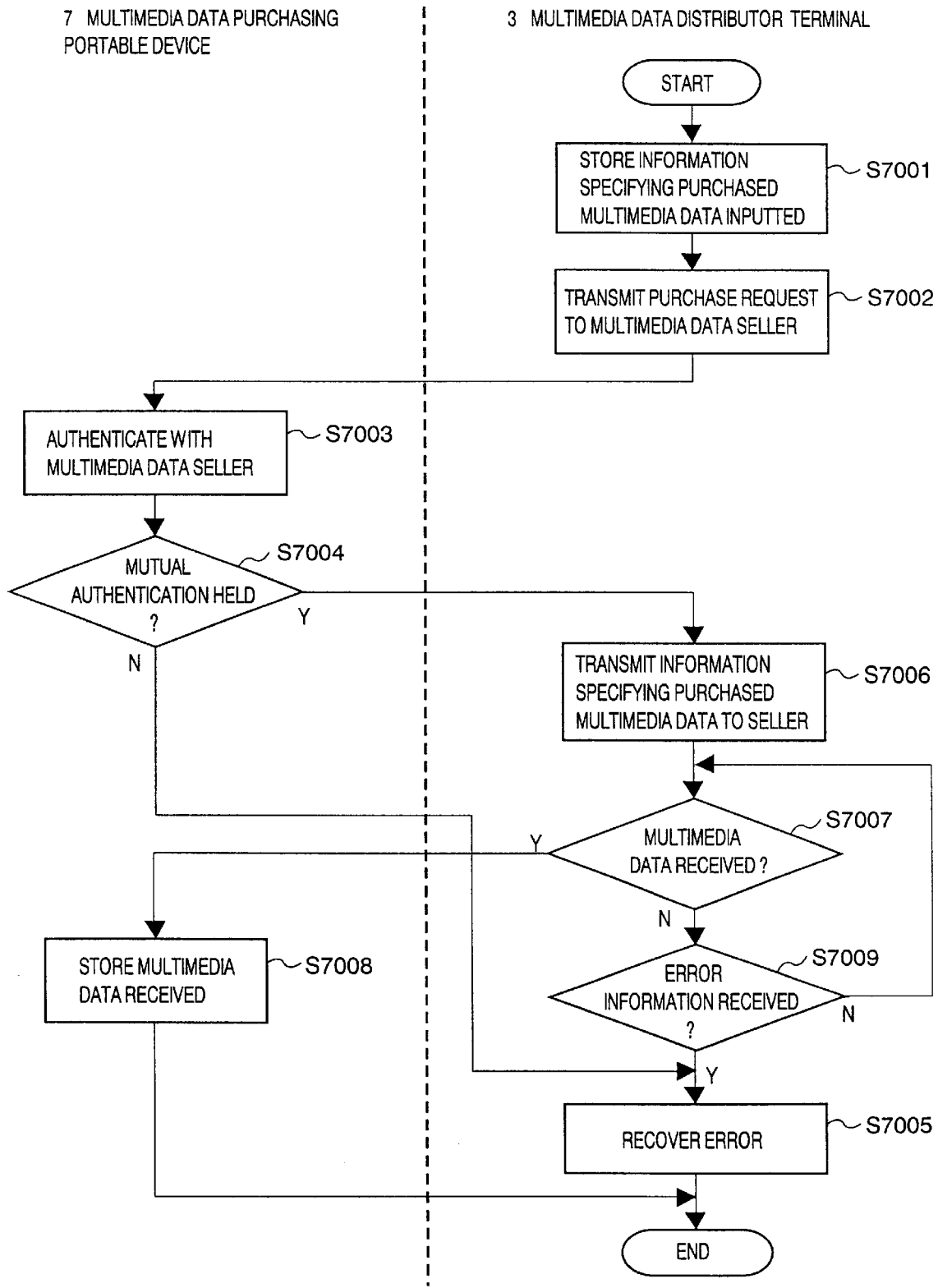
FIG. 15 is a flow chart showing operation of the multimedia data purchasing portable device 7 and the multimedia data distributor terminal 3, as shown in FIG. 1.

FIG. 15 is a flow chart showing operation of the multimedia data purchasing portable device 7 and the multimedia data distributor terminal 3. This flow is started when the owner of the multimedia data purchasing portable device 7 mounts the multimedia data purchasing portable device 7 on the multimedia data distributor terminal 3 and designates the multimedia data distributor terminal 3 the title and author of the multimedia data to be purchased, to indicate the purchase request for the multimedia data seller (i.e., the multimedia data distributing/purchasing device 1₃).

The input/output unit 91 of the multimedia data distributor terminal 3 stores the information specifying the multimedia data to be purchased such as the title and author of the multimedia data received from the user, in the multimedia data title/author information holding unit 101 (at Step S7001). The communication unit 96 transmits the purchase request to the multimedia data seller through the dedicated network 8 (at Step S7002).

The authentication unit 103 of the multimedia data purchasing portable device 7 authenticates with the multimedia data seller through the multimedia data distributor terminal 3 and the dedicated network 8 (at Step S7003). In a case where the result is that the mutual authentication is not completed (at Step S7004), the multimedia data distributor terminal 3 is informed of the failure. In response to this information, the multimedia data distributor terminal 3 performs a predetermined error recovery (at Step S7005) by informing the user that the multimedia data cannot be purchased.

In a case where the mutual authentication is completed (at Step S7004), on the other hand, the multimedia data distributor terminal 3 is informed of the success. In response to this information, the communication unit 96 of the multimedia data distributor terminal 3 reads the information specifying the multimedia data to be purchased from the multimedia data title/author information holding unit 101, and reads out the information specifying the multimedia data purchaser (i.e., the owner of the multimedia data purchasing portable device 7), as stored in the multimedia data purchasing portable device 7, from this device 7 and transmits the information to the multimedia data seller through the dedicated network 8 (at Step S7006).

After this, the communication unit 96 of the multimedia data distributor terminal 3 awaits transmission of the multimedia data to be purchased, as having the watermark information embedded, from the multimedia data seller (at Step S7007), and transmits the received multimedia data to the multimedia data purchasing portable device 7. In response to this, the multimedia data purchasing portable device 7 stores the watermarked multimedia data received in the multimedia data holding unit 104 (at Step S7008). Here, In a case where the communication unit 96 of the multimedia data distributor terminal 3 receives the error information from the multimedia data distributor device through the dedicated network 8 (at Step S7009), it performs the predetermined error recovery (at Step S7005) by informing the user that the multimedia data cannot be purchased.

Here will be described operation of a case in which the attribute information are to be verified by extracting the ID numbers from the watermarked multimedia data having the ID numbers and the meta-information embedded therein.

Figure 16:
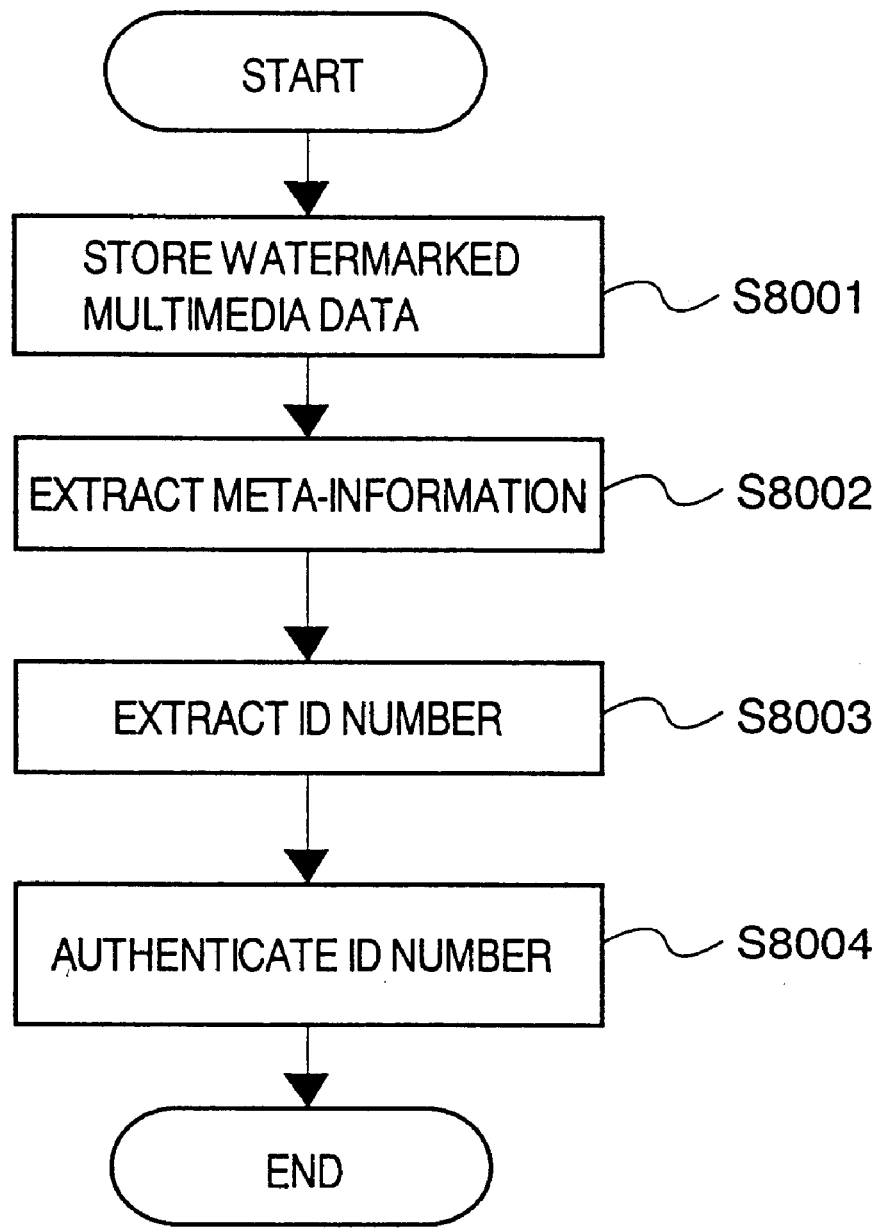
FIG. 16 is a flow chart showing operation of the ID verifying center side device 5 shown in FIG. 1.

FIG. 16 is a flow chart showing operation of the ID verifying center side device 5 of a case in which the ID number is extracted from the watermarked multimedia data to verify the attribute information. This flow is started when the watermarked multimedia data are brought into the ID verifying center side device 5 either through the Internet 9 or by recording them in the recording medium such as a CD-ROM or an FD.

The watermarked multimedia data, as brought in through the communication unit 56 (via the Internet 9) or the input/output unit 51 (via the recording medium), are stored in the watermarked multimedia data holding unit 64 (at Step S8001).

The watermark extracting unit 54 reads out the watermarked multimedia data, as stored in the watermarked multimedia data holding unit 64, and extracts the meta-information from the watermarked multimedia data (at Step S8002) by using the electronic watermarking method which has been determined in advance between the multimedia data distributor devices.

The watermark extracting unit 54 reads out the algorithm of the electronic watermarking method, as specified by the extracted meta-information, from the watermarking method rule storage unit 63, and extracts the ID number from the watermarked multimedia data in accordance with the algorithm and stores it in the ID number holding unit 62 (at Step S8003). In this embodiment, as has been described above, in a case where the additional ID number is to be embedded in the multimedia data having the ID number embedded therein, the additional ID number is embedded as the bit string starting from the next bit of the bit string indicating that ID number, by using the electronic watermarking method used to embed the ID number. Even In a case where the additional ID number is embedded in the multimedia data having the embedded ID number, the number composed of the ID number and the additional ID number can be extracted as one ID number from the multimedia data.

The ID verification unit 53 makes an access to the ID number database 41 of the ID issuing center side device 4 through the communication unit 56 and the Internet 9 or the dedicated communication line 2 to verify the attribute information which are made to correspond to the ID number stored in the ID number holding unit 62. If necessary, the ID verification unit 53 verifies another ID number which is made to correspond to the various information (such as the author, the title, the distributor and the purchaser of the multimedia data) contained in the verified attribute information (at Step S8004). Here, in a case where the communication unit 56 makes an access to the ID issuing center side device 4 through the Internet 9, the authentication unit 55 may authenticate with the ID issuing center side device 4 so that it may be enabled to make an access to the ID issuing center side device 4 only when the authentication is completed. In this case, on the other hand, the cipher communications may be made by using the cryptographic method which has been determined in advance with the ID issuing center side device 4.

In the present embodiment, the multimedia data distributor (i.e., multimedia data distributing/purchasing devices $1_1$ to $1_3$) transmits the attribute information of the multimedia data to be distributed, to the ID issuing center side device 4. In response to this, the ID issuing center side device 4 retrieves the ID number database 41 to examine whether or not the attribute information transmitted from the distributor of the multimedia data and the title and author of the multimedia data are coincident and whether or not the attribute information indicating that the distributor of the attribute information is the purchaser is registered. If the attribute information are not registered, it is thought that the multimedia data to be distributed are the first ones to be distributed on the market. Therefore, the basic number of a unique number is generated and is registered as the ID number in the ID number database in a manner to correspond to the attribute information transmitted by the distributor of the multimedia data. If already registered, on the other hand, it is thought that the multimedia data to be distributed are already distributed on the market and are copied and distributed again (so that they already have the ID number embedded therein). Therefore, the additional number is generated so that the number obtained by attaching the additional number of the ID number corresponding to the already registered attribute information may be a unique number which is not registered in the ID number database 41, and the number obtained by attaching the additional number to that ID number is registered as the ID number in the ID number database 41 in a manner to correspond to the attribute information transmitted from the distributor of the multimedia data.

The distributor of the multimedia data embeds the ID number or the additional ID number thus generated, as the watermark information in the multimedia data to be distributed, to distribute the electronic data to the purchaser (e.g., the multimedia data distributing/purchasing devices $1_1$ to $1_3$ or the multimedia data purchasing portable device 7) of the multimedia data. Here, in a case where the additional ID number is to be embedded, since the multimedia data to be distributed already has the ID number embedded therein, the additional ID number is embedded as a bit string starting from the next bit of the bit string indicating the already embedded ID number, in the multimedia data.

With the construction thus far described, according to the present embodiment, a unique ID number can be attached to each of the multimedia data appearing on the market.

On the other hand, the ID verifying center side device 5 verifies the purchaser and the distributor of the multimedia data having the ID number embedded therein, by extracting the ID number from the multimedia data appearing on the market and by retrieving the ID number database 41 of the ID issuing center side device 4. In a case where the multimedia data are unlawfully copied, for example, the person having copied unlawfully or having allowed to copy unlawfully can be specified by specifying the purchaser of the multimedia data, as described above. According to the present embodiment, on the other hand, even In a case where the once distributed multimedia data are copied and distributed again, there is embedded in the copied data the ID number (composed of the basic number+the additional number) relating to the ID number (composed of the basic number) embedded in the original multimedia data. By retrieving the database, therefore, it is possible to know what distribution route the multimedia data have been distributed on.

In this embodiment, on the other hand, the multimedia data distributing/purchasing devices $1_1$ to $1_3$ embed the information indicating the electronic watermarking method, as used at the time of embedding the ID number in the multimedia data, as the meta-information in the multimedia data having the embedded ID number, by using the electronic watermarking method (which exerts no influence on the extraction of the ID number embedded in the multimedia data) which has been determined in advance with the ID verifying center side device 5. Then, the ID verifying center side device 5 extracts at first the meta-information from the multimedia data by using the electronic watermarking method determined in advance with the multimedia data distributing/purchasing devices $1_1$ to $1_3$, and then reads out the algorithm of the electronic watermarking method indicated by the extracted meta-information, from the watermarking method rule storage unit 63 which is stored with the algorithm of the electronic watermarking method submitted in advance by the multimedia data distributing/purchasing devices $1_1$ to $1_3$, so that it extracts the ID number from the multimedia data in accordance with the algorithm thus read out. According to the present embodiment, therefore, the multimedia data distributing/purchasing devices $1_1$ to $1_3$ for embedding the ID number at first in the multimedia data can embed the ID number by using a desired electronic watermarking method.

Here in the present embodiment, the ID number and the meta-information are embedded in the multimedia data in the multimedia data distributing/purchasing devices $1_1$ to $1_3$ but may be embedded in the multimedia data in the ID issuing center side device 4.

Figure 17:
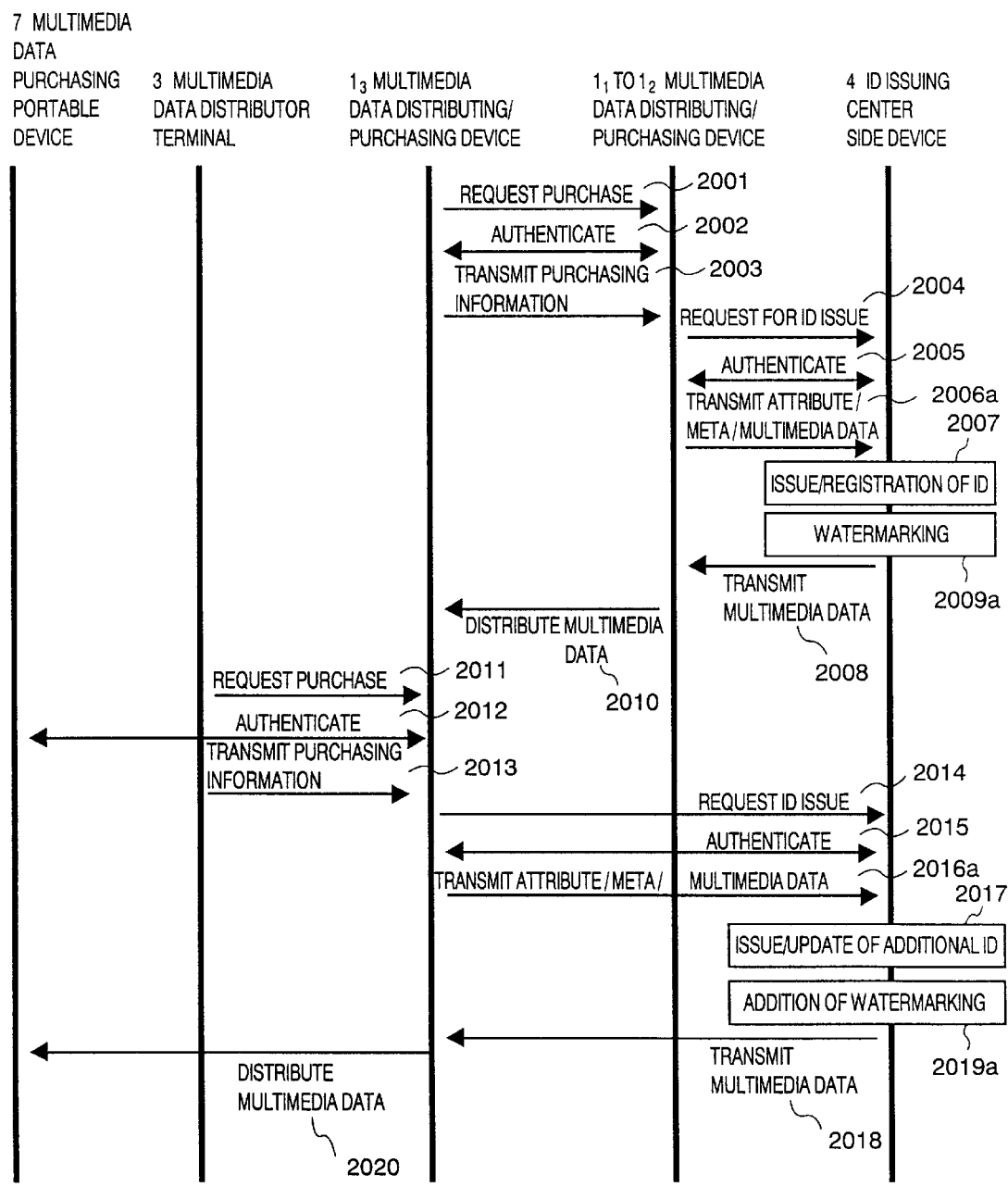
FIG. 17 is a diagram showing the transfers of data among the individual devices, in a case where the ID numbers and the meta-information are embedded in the multimedia data by the ID issuing center side device 4, as shown in FIG. 2.

FIG. 17 is a diagram showing the transfers of data among the individual devices, as modified FIG. 2 such that the ID issuing center side device 4 embeds the ID number and the meta-information in the multimedia data. As shown, the multimedia data distributing/purchasing devices $1_1$ and $1_2$ transmits, if the mutual authentication is completed with the ID issuing center side device 4 (at 2005), not only the attribute information but also the multimedia data themselves to be purchased and the meta-information indicating the electronic watermarking method to be used for embedding the ID number, to the ID issuing center side device 4 (at 2006a). In response to this, the ID issuing center side device 4 generates a unique basic number, which is not registered in the ID number database, and registers the unique basic number as the ID number in the database (at 2007) in a manner to correspond to the attribute information transmitted by the multimedia data distributing/purchasing devices $1_1$ and $1_2$. The ID issuing center side device 4 reads out the algorithm of the electronic watermarking method specified by the received meta-information, from the electronic watermarking method rule storage unit 63, and embeds the generated basic number as the ID number in the received multimedia data to be purchased, in accordance with that algorithm, and the received meta-information in the multimedia data by using the watermarking method determined in advance with the ID verifying center side device 5 (at 2009a). Then, the ID issuing center side device 4 transmits the watermarked multimedia data thus having the ID number and meta-information embedded therein, to the multimedia data distributor devices $1_1$ and $1_2$ (at 2008). These multimedia data distributor devices $1_1$ and $1_2$ transmit the watermarked multimedia data sent from the ID issuing center side device 4, to the multimedia data purchaser (at 2010).

When the mutual authentication with the ID issuing center side device 4 is completed (at 2015), on the other hand, the multimedia data distributing/purchasing device $1_3$ transmits not only the attribute information but also the multimedia data to be purchased themselves and the meta-information indicating the electronic watermarking method to be used for embedding the ID number, to the ID issuing center side device 4 (at 2016a). The ID issuing center side device 4: confirms that the attribute information held in the attribute information holding unit 43 and the title and author of the multimedia data are coincident and that the attribute information indicating that the distributor of the attribute information is the purchaser is registered; generates an additional number such that the number to be obtained by attaching the additional number to the ID number corresponding to the attribute information may become a unique number which is not registered in the ID number database 41; and registers the number obtained by attaching the additional number to that ID number, as the ID number in the ID number database 41 in a manner to correspond to the attribute information transmitted by the multimedia data distributing/purchasing device $1_3$ (at 2017). The ID issuing center side device 4: extracts the meta-information (although the meta-information transmitted by the multimedia data distributing/purchasing device $1_3$ is ignored) from the received multimedia data to be purchased; reads out the algorithm of the electronic watermarking method specified by the extracted meta-information, from the electronic watermarking method rule storage unit 63; and embeds the generated additional ID number in the received multimedia data to be purchased, in accordance with that algorithm (at 2019a). At this time, the additional ID number is embedded, as a bit string starting from the next bit of the bit string indicating the original ID number attaching to the additional ID number, in the multimedia data. Thus, the multimedia data having the additional ID number embedded therein are transmitted to the multimedia data distributor device $1_3$ (at 2018). This multimedia data distributor device $1_3$ transmits the watermarked multimedia data sent from the ID issuing center side device 4, to the multimedia data purchaser (at 2020).

In the present embodiment, on the other hand, the multimedia data distributing/purchasing devices $1_1$ to $1_3$ transmit the attribute information of the multimedia data to the ID issuing center side device 4, and this ID issuing center side device 4 retrieves the ID number database 41 on the basis of the attribute information transmitted, to decide whether the basic number or the additional number is to be generated. However, the present invention may be modified in the following by providing the multimedia data distributing/purchasing devices $1_1$ to $1_3$ with the watermark extracting unit 54.

In the multimedia data distributing/purchasing devices $1_1$ to $1_3$, more specifically, the watermark extracting unit 54 and the watermarking method rule storage unit 26 are used to examine whether or not the ID number is embedded as the electronic watermark information in the multimedia data to be purchased which is to be distributed. Moreover, the ID number is extracted, if it is embedded, and transmitted together with the attribute information of the multimedia data to be purchased, to the ID issuing center side device 4.

In response to this, the ID issuing center side device 4: confirms it when the ID number is transmitted together with the attribute information by the multimedia data distributing/purchasing devices $1_1$ to $1_3$ that the ID number is registered in the ID number database 41: then generates an additional number such that a number obtained by attacing the additional number to the ID number may become a unique number which is not registered in the ID number database 41; and registers the number, which has been obtained by attaching the additional number to the ID number, as the ID number in the ID number database 41 in a manner to correspond to the attribute information. Then, the generated additional number is transmitted as the additional ID number to the multimedia data distributing/purchasing devices $1_1$ to $1_3$ having transmitted the attribute information and the ID number.

In response to this, the multimedia data distributing/purchasing devices $1_1$ to $1_3$ use the watermark embedding unit 14 and the watermarking method rule storage unit 26, to embed the additional ID number transmitted by the ID issuing center side device 4, as a bit string starting from the next bit of the bit string of the ID number extracted from the multimedia data to be purchased, in these multimedia data.

Here will be described a second embodiment of the present invention.

The foregoing first embodiment has been described on a case in which all the generations of the ID numbers (or the basic numbers) and the additional ID numbers (or the additional numbers) are performed in the ID issuing center side device 4.

The second embodiment will be described on the case in which only the ID numbers of the basic numbers are issued by an ID issuing center side device 4' whereas the additional ID numbers are issued individually by multimedia data distributing/purchasing devices $1'_1$ to $1'_3$.

Figure 18:
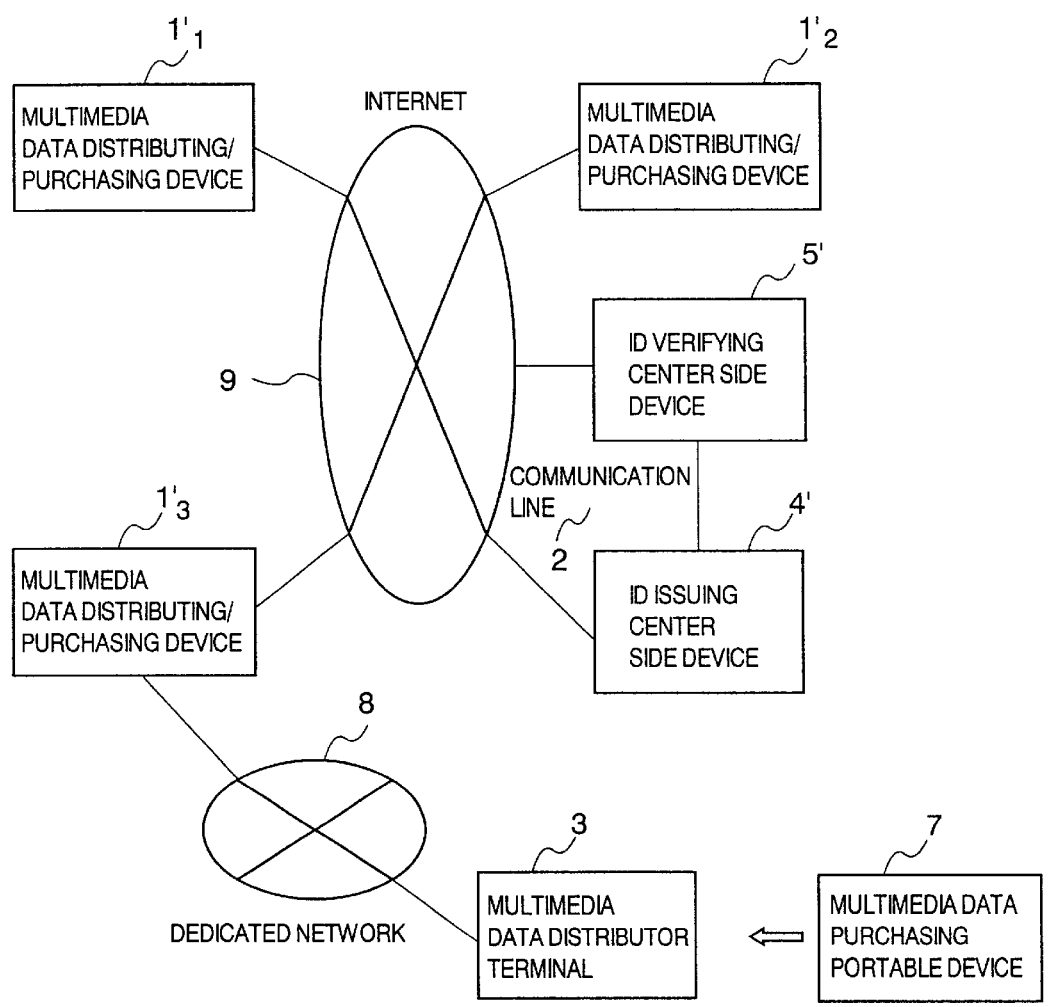
FIG. 18 is a diagram for schematically explaining a multimedia data distribution system to which a second embodiment of the present invention is applied.

FIG. 18 is a diagram for schematically explaining a multimedia data distribution system to which the second embodiment of the present invention is applied.

As shown, the multimedia data distribution system of the present embodiment is constructed such that a plurality of multimedia data distributing/purchasing devices $1'_1$ to $1'_3$, the ID issuing center side device 4' and an ID verifying center side device 5' are connected with one another through the Internet 9. On the other hand, the multimedia data distributing/purchasing device $1'_3$ is connected through a dedicated network 8 such as an on-line system with a multimedia data distributor terminal 3 which can mount a multimedia data purchasing portable device 7. Moreover, the ID verifying center side device 5' is connected through the dedicated communication line 2 with the ID issuing center side device 4'. Here, the multimedia data distributor terminal 3 and the multimedia data purchasing portable device 7 are identical to those of the foregoing first embodiment.

In the multimedia data distribution system thus constructed, let the case be considered, in which the user of the multimedia data distributing/purchasing device $1'_3$ purchases the multimedia data (which is assumed to have never come into the market) provided by the multimedia data distributing/purchasing devices $1'_1$ and $1'_2$.

Figure 19:
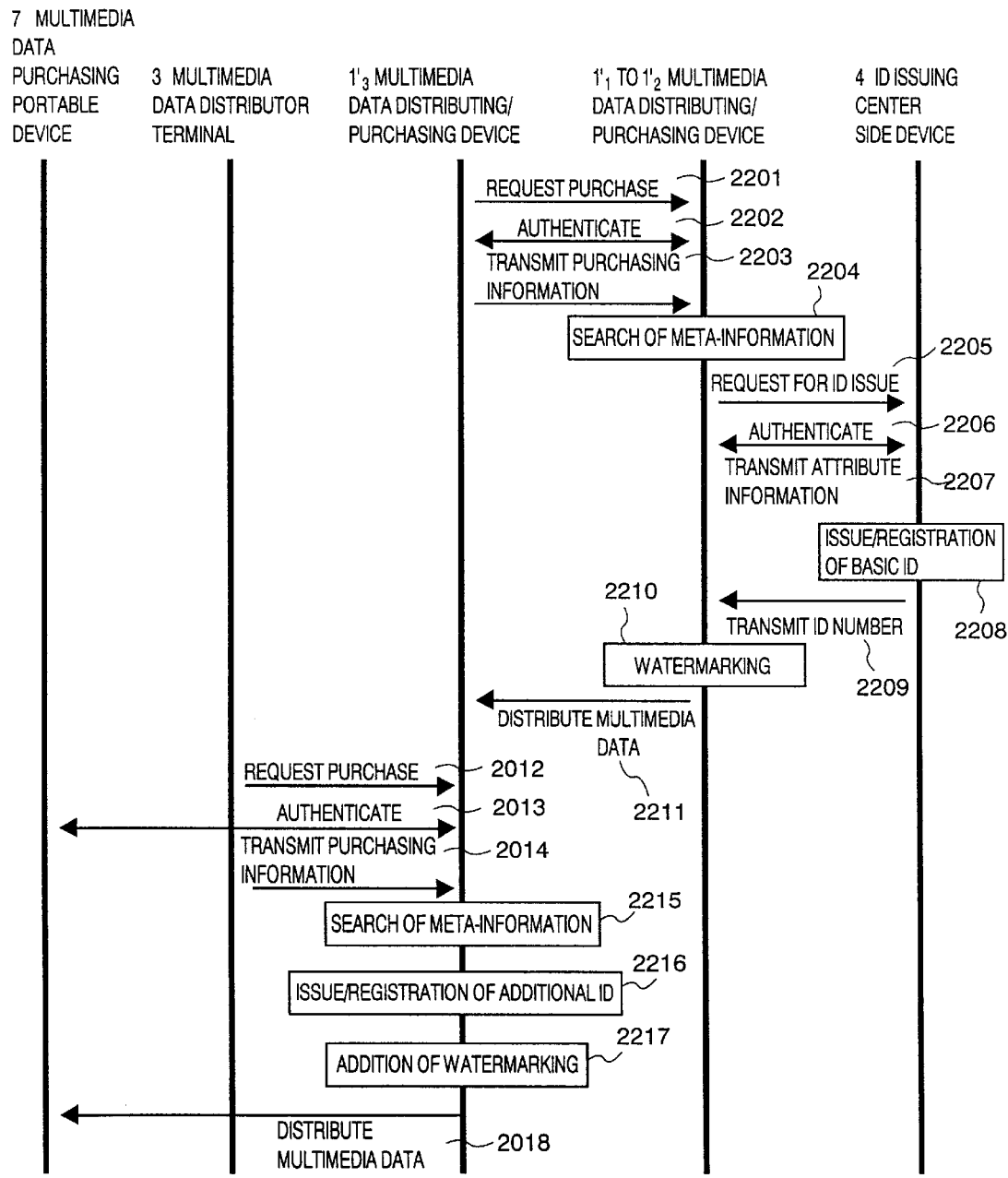
FIG. 19 is a diagram showing transfers of data among individual devices of the multimedia data distribution system shown in FIG. 18.

As shown in FIG. 19, the multimedia data distributing/purchasing device $1'_3$ is used: to transmit a purchasing request to the multimedia data distributing/purchasing devices $1'_1$ or $1'_2$ (at 2201); to authenticate with each other (at 2202); and to transmit the information on the purchaser himself, the title of the multimedia data to be purchased, and the information of the author (at 2203).

The multimedia data distributing/purchasing devices $1'_1$ and $1'_2$ having received the information on the purchaser, the title of the multimedia data to be purchased and the information on the author from the multimedia data distributing/purchasing device $1'_3$: copies the multimedia data to be purchased, as stored in its own multimedia data database, and searches by using the electronic watermarking method determined in advance with the ID verifying center side device 5' whether or not bit number information of the ID numbers embedded in the multimedia data are embedded as the meta-information in the copied multimedia data (at 2204). Here, it is assumed that the multimedia data provided by the multimedia data distributing/purchasing devices $1'_1$ and $1'_2$ have never appeared on the market. It follows that the ID numbers are not embedded in the multimedia data to be purchased so that the bit number information are not embedded either. In this case, the multimedia data distributing/purchasing devices $1'_1$ and $1'_2$: transmits the ID issuing request to the ID issuing center side device 4' (at 2205); authenticate with each other (at 2206); and transmit the information on the purchaser, the title of the multimedia data to be purchased and the information on the author, as received from the multimedia data distributing/purchasing device $1'_3$, and the attribute information containing the information on the distributor himself (at 2207).

The ID issuing center side device 4' having received the attribute information from the multimedia data distributing/purchasing devices $1'_1$ and $1'_2$ issues a basic ID number or a unique number, which is not registered yet in the basic ID number database in which the basic ID numbers issued already by the ID issuing center are registered to correspond to the attribute information, and registers the issued basic ID numbers in the basic ID number database in a manner to correspond to the attribute information transmitted by the multimedia data distributing/purchasing devices $1'_1$ and $1'_2$ (at 2208). Then, the ID issuing center side device 4' transmits the issued basic numbers to the multimedia data distributing/purchasing devices $1'_1$ and $1'_2$ having transmitted the attribute information (at 2209).

The multimedia data distributing/purchasing devices $1'_1$ and $1'_2$ having received the basic ID numbers from the ID issuing center side device 4' embeds the basic ID numbers as the electronic watermark information in the copied multimedia data to be purchased. Then, the watermarking method specifying information indicating the electronic watermarking method used to embed the basic ID numbers in the multimedia data and the bit number information of the basic ID numbers are embedded as the meta-information in the multimedia data by using the electronic watermarking method which has been determined in advance with the ID verifying center side device 5' (at 2210). The multimedia data thus having the basic ID numbers and the meta-information embedded therein are transmitted to the multimedia data distributing/purchasing device $1'_3$ (at 2211). This multimedia data distributing/purchasing device $1'_3$ receives the multimedia data to be purchased, as transmitted from the multimedia data distributing/purchasing devices $1'_1$ and $1'_2$, and stores them in its own multimedia data database.

Let a case be considered, in which the multimedia data thus acquired by the multimedia data distributing/purchasing device $1'_3$ are purchased by a user of the multimedia data purchasing portable device 7.

This multimedia data purchasing portable device 7 is mounted on the multimedia data distributor terminal 3. As shown in FIG. 19, the multimedia data distributor terminal 3 is used: to transmit a purchasing request to the multimedia data distributing/purchasing device $1'_3$ (at 2012); to mutually authenticate between the multimedia data purchasing portable device 7 and the multimedia data distributing/purchasing device $1'_3$ (at 2013); and to transmit the information on the purchaser himself and the information on the title and author of the multimedia data to be purchased (at 2014).

The multimedia data distributing/purchasing device $1'_3$ having received the information on the purchaser, the title of the multimedia data to be purchased and the information on the author from the multimedia data distributor terminal 3: copies the multimedia data to be purchased, which is stored in its own multimedia data database, and searches by using the electronic watermarking method determined in advance with the ID verifying center side device 5' whether or not the bit number information of the ID numbers are embedded as the meta-information in the copied multimedia data (at 2215). Here, it is assumed that the multimedia data provided by the multimedia data distributing/purchasing device $1'_3$ are those purchased from the multimedia data distributing/purchasing device $1'_1$ and $1'_2$. It follows that the basic ID numbers are not embedded in the multimedia data to be purchased so that the bit number information should be embedded. In this case, the multimedia data distributing/purchasing device $1'_3$ issues an additional ID number or a unique number, which is not registered yet in the additional ID number database in which the additional ID numbers issued already by itself are registered to correspond to the attribute information, and registers the additional ID numbers in the additional ID number database in a manner to correspond to the attribute information containing the information of the purchaser transmitted by the multimedia data distributor terminal 3, the information on the title and author of the multimedia data to be purchased, and the information of the distributor himself (i.e., the owner of the multimedia data distributing/purchasing device $1'_3$) (at 2216).

The multimedia data distributing/purchasing device $1'_3$ extracts the watermarking method specifying information, which is embedded as the meta-information, from the copied multimedia data to be purchased, by using the predetermined electronic watermarking method which has been determined in advance with the ID verifying center side device 5'. Then, the multimedia data distributing/purchasing device $1'_3$ embeds the issued additional ID number by using the electronic watermarking method specified by the extracted information. At this time, the multimedia data distributing/purchasing device $1'_3$ embeds the additional ID number, as a bit string starting from the next bit of the bit string specified by the bit number information extracted from the copied multimedia data to be purchased, in the multimedia data. Then, the multimedia data distributing/purchasing device $1'_3$ updates the bit number information embedded as the meta-information in the multimedia data, by using the predetermined electronic watermarking method determined in advance with the ID verifying center side device 5'. For example, the multimedia data distributing/purchasing device $1'_3$ once removes the bit number information embedded as the meta-information in the multimedia data, and then embeds the information indicating the bit number, which is generated by adding the bit number of the additional ID number embedded at this time to the bit number indicated by the removed bit number information, as new bit number information.

Thus, the multimedia data having the embedded additional ID number are transmitted through the multimedia data distributor terminal 3 to the multimedia data purchasing portable device 7 (at 2218).

In a case where the attribute information are to be verified by extracting the ID number from the multimedia data in which the ID number and the meta-information are embedded, as described above, the multimedia data are brought, either through the Internet 9 or after having been recorded in a recording medium such as a CD-ROM or an FD, to the ID verifying center side device 5. In response thereto, the ID verifying center side device 5' extracts the meta-information from the multimedia data by using the electronic watermarking method which has been determined in advance with the individual multimedia data distributor devices $1'_1$ to $1'_3$. After this, the ID verifying center side device 57 uses the electronic watermarking method specified by the extracted meta-information, to extract the ID number (which is either the basic ID number or a number consisting of the basic ID number and the additional ID number attached thereto) from the multimedia data. Next, the ID verifying center side device 5' retrieves the basic ID number database of the ID issuing center side device 4' through the dedicated communication line or the Internet 9, to verify the attribute information corresponding to the portion of the basic ID number. In a case where the ID number is constructed by adding the additional ID number to the basic ID number, the additional ID number database of the multimedia data distributor devices $1'_1$ to $1'_3$, as specified by the purchaser information of the multimedia data contained in the verified attribute information, is retrieved to verify the attribute information which are made to correspond to the portion of the additional ID number succeeding to the basic ID number of that ID number. These operations are executed for all the portions of the ID numbers, to grasp the distribution route of the multimedia data.

Of the individual devices constructing the aforementioned multimedia data distribution system, here will be described the multimedia data distributing/purchasing devices $1'_1$ to $1'_3$, the ID issuing center side device 4' and the ID verifying center side device 5'. Here, description with regard to the multimedia data distributor terminal 3 and the multimedia data purchasing portable device 7 will be omitted because they are identical to those of the foregoing first embodiment.

Here will be described the multimedia data distributing/purchasing devices $1'_1$ to $1'_3$.

Figure 20:
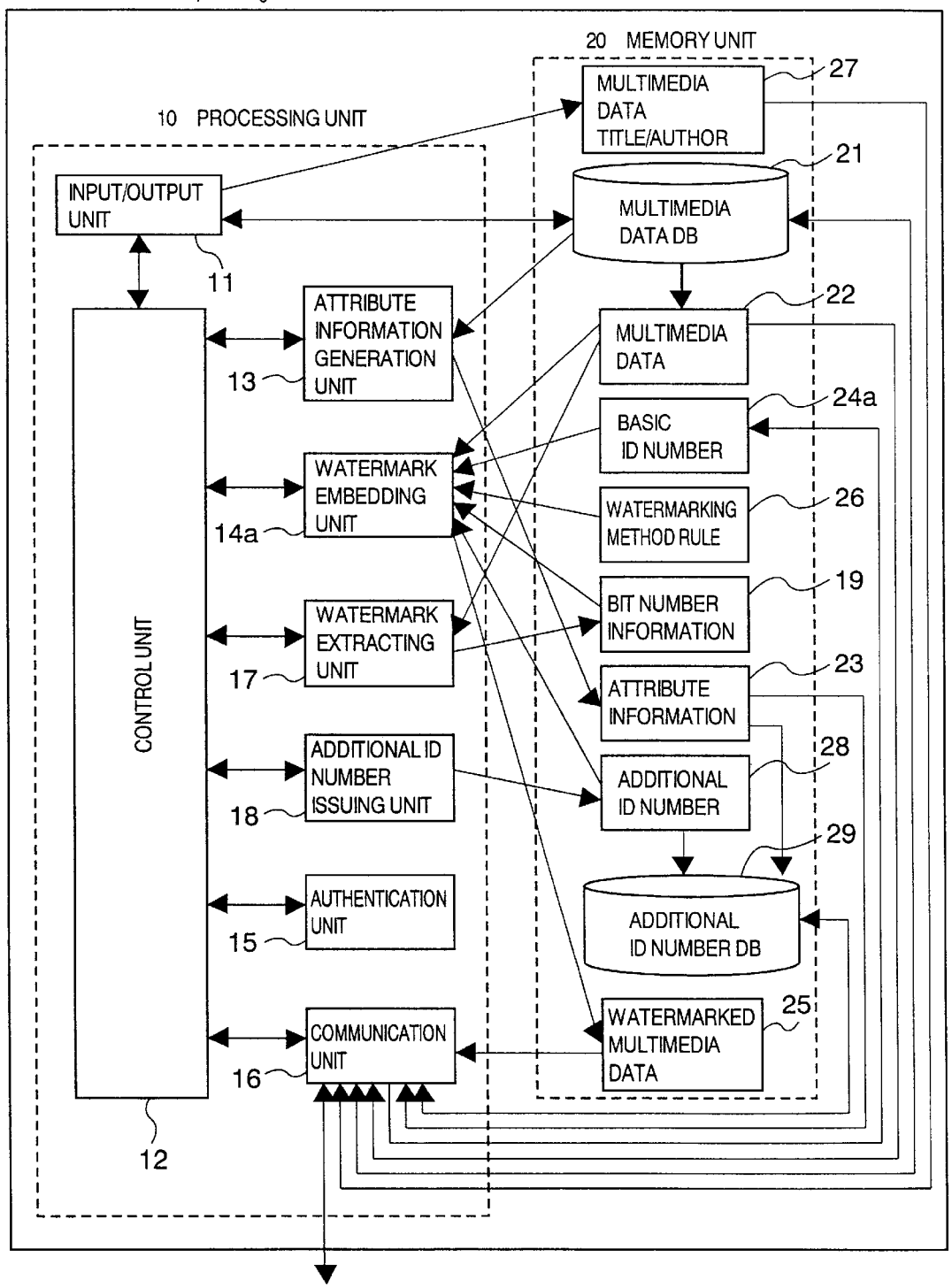
FIG. 20 is a schematic construction diagram of multimedia data distributor devices $1'_1$ to $1'_3$ shown in FIG. 18.

FIG. 20 is a schematic construction diagram of the multimedia data distributing/purchasing devices $1'_1$ to $1'_3$.

As shown, the multimedia data distributing/purchasing devices $1'_1$ to $1'_3$ of this embodiment are different from the multimedia data distributing/purchasing devices $1_1$ to $1_3$ of the first embodiment shown in FIG. 3, in that the watermark embedding unit 14 and the ID number holding unit 24 are replaced by a watermark embedding unit 14a and a basic ID number holding unit 24a, and in that there are further provided a watermark extracting unit 17, an additional ID number issuing unit 18, a bit number information holding unit 19, an additional ID number holding unit 28 and an additional ID number database 29.

The watermark extracting unit 17 examines whether or not the bit number information are embedded as the meta-information in the multimedia data to be purchased, as held in the multimedia data holding unit 22, by using the electronic watermarking method determined in advance with the ID verifying center side device 5', and extracts and stores the bit number information, if it is embedded, in the bit number information holding unit 19.

The additional ID number issuing unit 18 issues, In a case where the bit number information are extracted from the multimedia data to be purchased are extracted by the watermark extracting unit 17, the additional ID number of a predetermined bit length or a unique number, which is not registered in the additional ID number database 29 in which the additional ID number already having been issued by itself is registered to correspond to the attribute information, and registers the additional ID number in the additional ID number database 29 in a manner to correspond to the attribute information stored in the attribute information holding unit 23. On the other hand, the additional ID number issuing unit 18 stores the additional ID number in the additional ID number holding 28.

The watermark embedding unit 14a embeds, In a case where the basic ID number holding unit 24a holds the basic ID number transmitted from the ID issuing center side device 4', the basic ID number held in the basic ID number holding unit 24a, as the watermark information in the multimedia data to be purchased, which is held in the multimedia data holding unit 22. On the other hand, the watermark embedding unit 14a embeds the watermarking method information indicating the electronic watermarking method, which was used to embed the bit number information of the basic ID number and the basic ID number, as the meta-information in the multimedia data to be purchased, by using the electronic watermarking method which is determined in advance with the ID verifying center side device 5'.

In a case where the additional ID number holding unit 28 holds the additional ID number issued by the additional ID issuing unit 18, on the other hand, the electronic watermarking method determined in advance with the ID verifying center side device 5' is used to extract the watermarking method information embedded as the meta-information, from the multimedia data to be purchased, and the algorithm of the electronic watermarking method specified by the extracted information is read out from the watermarking method rule storage unit 26. In accordance with the read algorithm, moreover, the additional ID number is embedded, as a bit string starting from the next bit of the bit string specified by the bit number information held in the bit number information holding unit 19, in the multimedia data to be purchased. On the other hand, the electronic watermarking method determined in advance with the ID verifying center side device 5' is used to update the bit number information which are stored as the meta-information in the multimedia data to be purchased. For example, there are once removed the bit number information which are embedded as the meta-information in the multimedia data to be purchased. Then, the information indicating the bit number which is the sum of the bit number indicated by the removed bit number information and the bit number of the additional ID number embedded at this time are embedded as new bit number information.

Here will be described the ID issuing center side device 4'.

Figure 21:
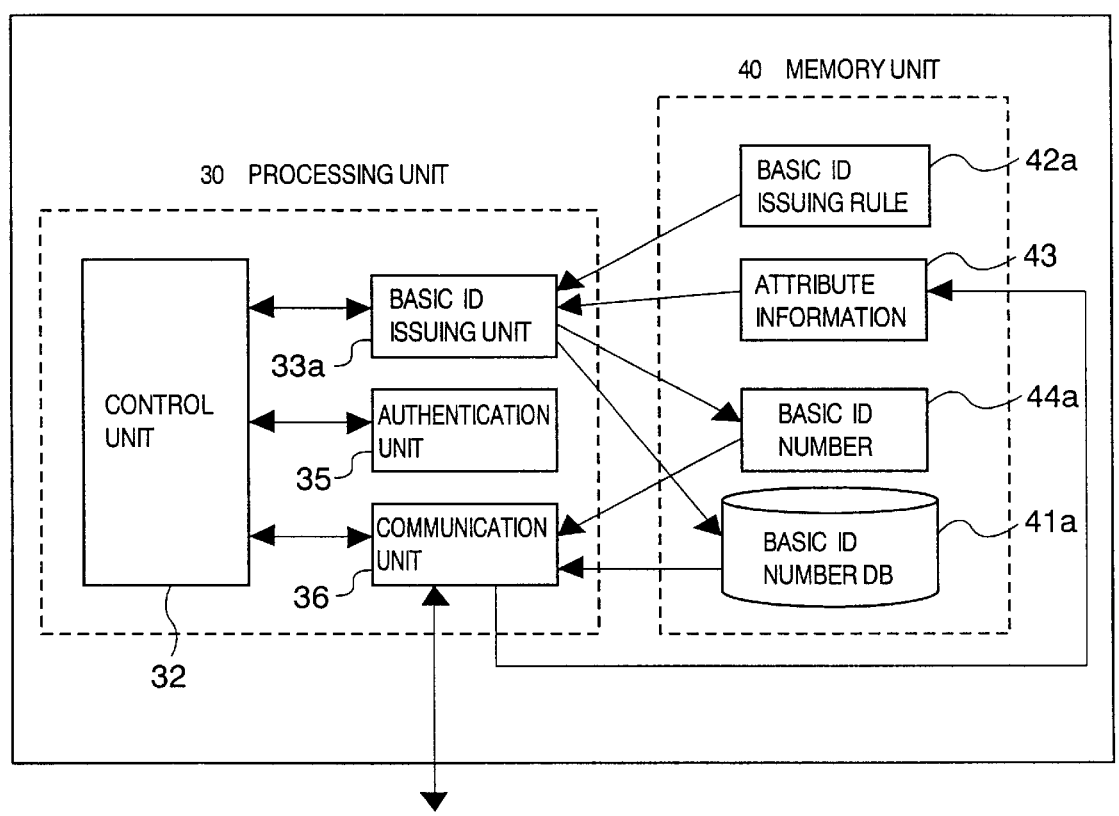
FIG. 21 is a schematic construction diagram of an ID issuing center side device 4' shown in FIG. 18.

FIG. 21 is a schematic construction diagram of the ID issuing center side device 4'.

As shown, the ID issuing center side device 4' of the present embodiment is different from the ID issuing center side device 4 of the first embodiment shown in FIG. 4, in that the ID issuing unit 33, the ID issuing rule storage unit 42, the ID number holding unit 44 and the ID number database 41 are replaced with a basic ID issuing unit 33a, a basic ID issuing rule storage unit 42a, a basic ID number holding unit 44a and a basic ID number database 41a.

The basic ID issuing unit 33a issues the basic ID number of a predetermined bit length or a unique number, as not registered in the basic ID number database 41a in which the basic ID number already issued by the ID issuing center is registered to correspond to the attribute information, to the attribute information held in the attribute information holding unit 43, and registers the issued basic ID number in the basic ID number database 41a in a manner to correspond to the attribute information held in the attribute information holding unit 43. In addition, the ID issuing unit stores the basic ID number in the basic ID number holding unit 44a.

Here will be described the ID verifying center side device 5'.

Figure 22:
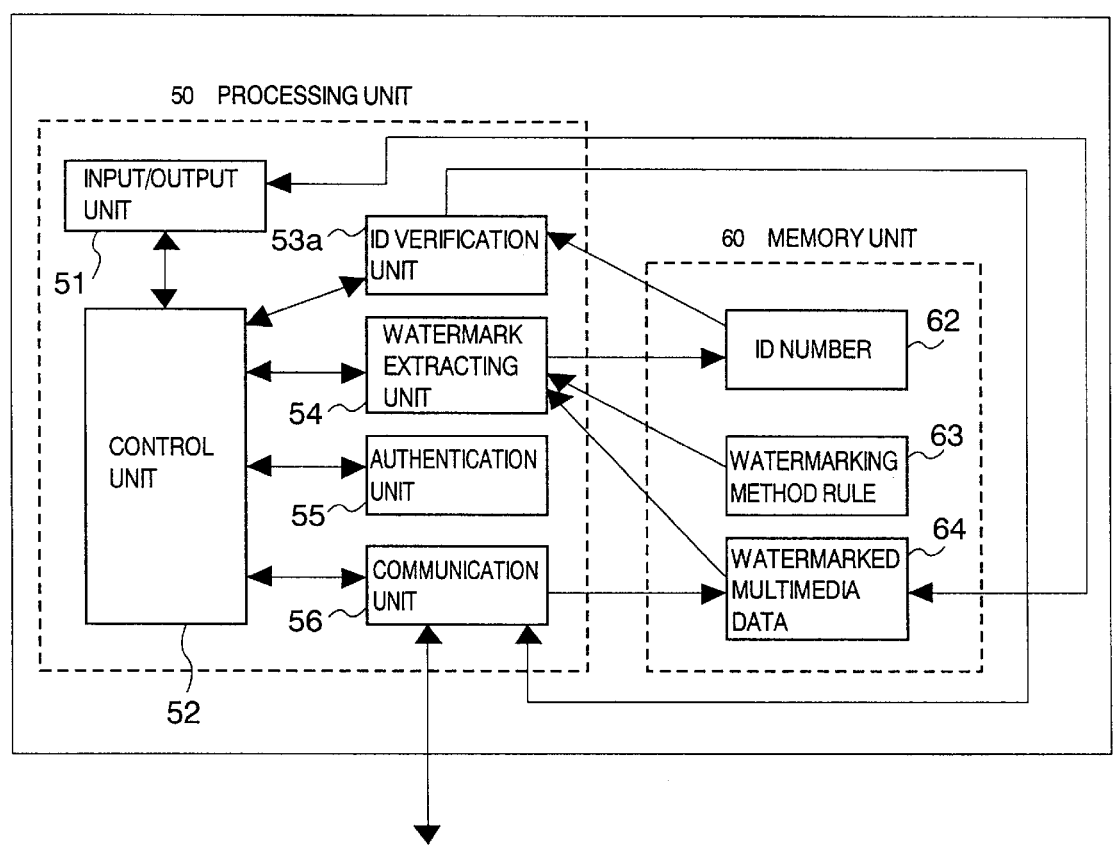
FIG. 22 is a schematic construction diagram of an ID verifying center side device 5' shown in FIG. 18.

FIG. 22 is a schematic construction diagram of the ID verifying center side device 5'.

As shown in the figure, the ID verifying center side device 5' of the present embodiment is different from the ID verifying center side device 5 of the first embodiment shown in FIG. 5 in that the ID verification unit 53 is replaced with an ID verification unit 53a.

The ID verification unit 53a makes an access to the ID number database 41 of the ID issuing center side device 4' through the communication unit 56 and the dedicated communication line 2 or the Internet 9, and verifies the attribute information which are made to correspond to a portion (i.e., a bit string from the leading bit of the ID number to a portion corresponding to the bit length of the basic ID number) corresponding to the basic ID number of the ID number held in the ID number holding unit 64. In a case where the ID number held in the ID number holding unit 64 is constructed such that the additional ID number is added to the basic ID number (that is, In a case where the bit length of the ID number held in the ID number holding unit 64 is longer than the bit length of the basic ID number), on the other hand, the ID verification unit 53a retrieves the additional ID number database 29 of the multimedia data distributor devices $1'_1$ to $1'_3$, as specified by the purchaser information of the multimedia data contained in the verified attribute information, through the Internet 9, and verifies the attribute information which are made to correspond to a portion (i.e., a bit string from the bit succeeding to the portion corresponding to the bit length of the basic ID number form the leading bit of the ID number to the portion corresponding to the bit length of the additional ID number) of the additional ID number succeeding to the basic ID number of the ID number. These operations are executed for all the portions of the ID number to grasp the distribution route of the multimedia data.

Of the individual devices of the multimedia data distribution system thus constructed, here will be described operation of the multimedia data distributing/purchasing devices $1'_1$ to $1'_3$, the ID issuing center side device 4' and the ID verifying center side device 5'. Here, the multimedia data distributor terminal 3 and the multimedia data purchasing portable device 7 will be omitted because their operations are identical to those of the foregoing first embodiment.

Here will be described the multimedia data distributing/purchasing devices $1'_1$ to $1'_3$.

Here, operation of a case in which the multimedia data distributing/purchasing devices $1'_1$ to $1'_3$ purchase the multimedia data from the other multimedia data distributing/purchasing devices $1'_1$ to $1'_3$ are identical to those of the case of the multimedia data distributing/purchasing devices $1_1$ to $1_3$ of the first embodiment. Therefore, the description of this case will be omitted but directed exclusively to operation of the multimedia data distributing/purchasing devices $1'_1$ to $1'_3$ of a case in which the multimedia data distributing/purchasing devices $1'_1$ to $1'_3$ distribute the multimedia data to the other multimedia data distributing/purchasing devices $1'_1$ to $1'_3$.

Figure 23:
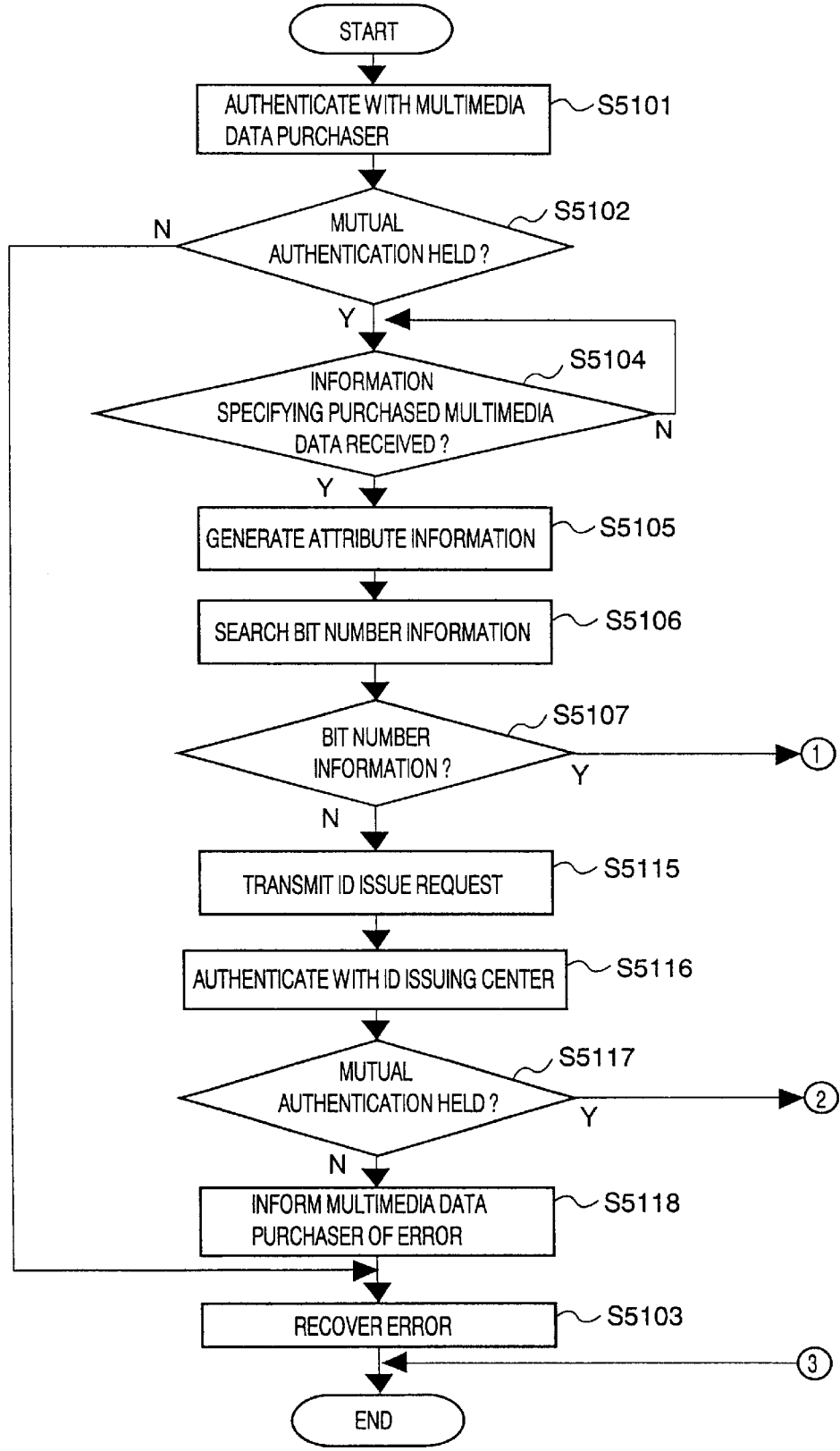
FIG. 23 is a flow chart showing operation of a case in which the multimedia data distributor devices $1'_1$ to $1'_3$ shown in FIG. 18 distribute the multimedia data.
Figure 24:
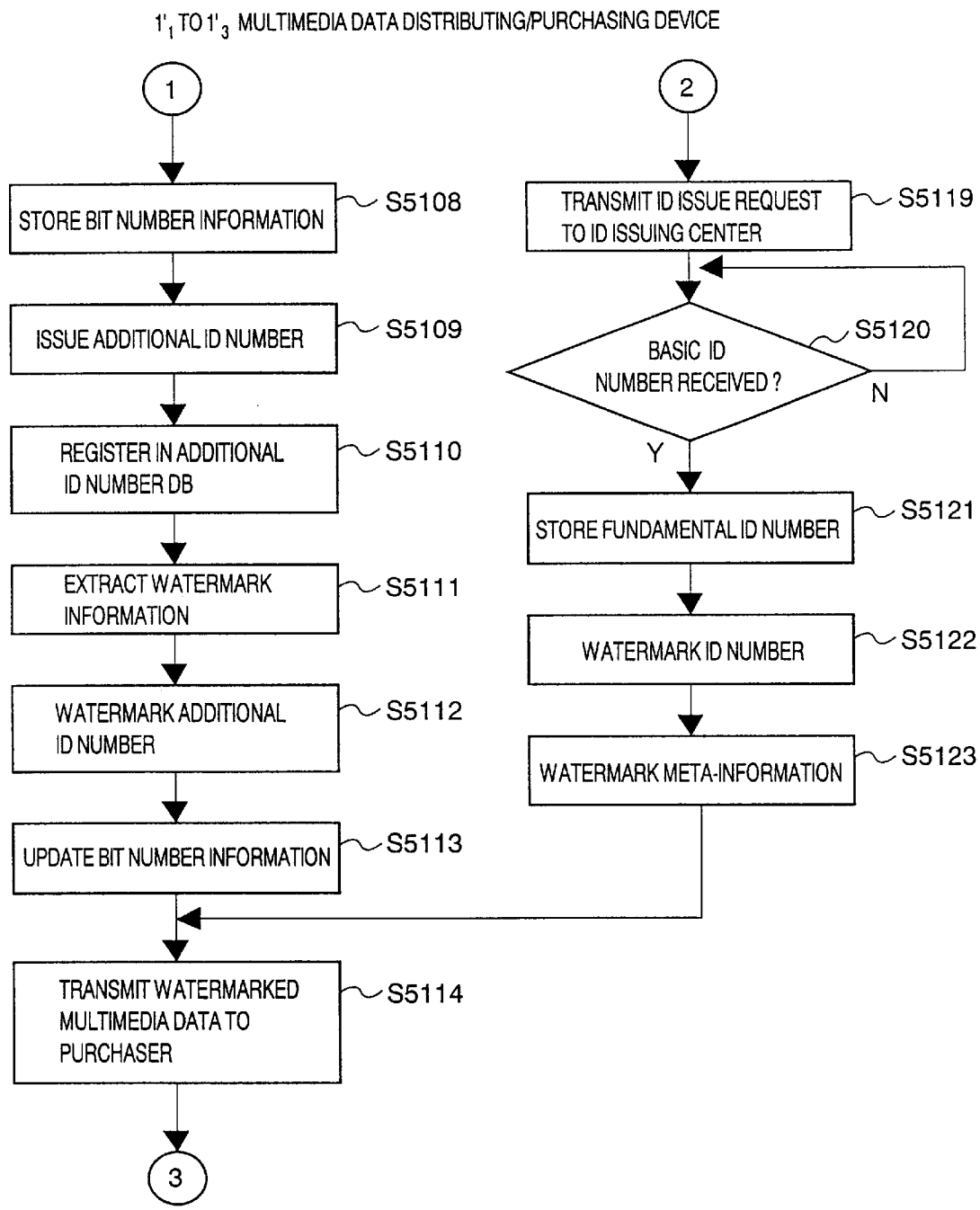
FIG. 24 is a flow chart showing operation of a case in which the multimedia data distributor devices $1'_1$ to $1'_3$ shown in FIG. 18 distribute the multimedia data.

FIGS. 23 and 24 are a flow chart showing operation of the multimedia data distributing/purchasing devices $1'_1$ to $1'_3$, In a case where the multimedia data distributing/purchasing devices $1'_1$ to $1'_3$ distribute the multimedia data to the other multimedia data distributing/purchasing devices $1'_1$ to $1'_3$. This flow is started when there is received the purchase request transmitted from the multimedia data purchaser (i.e., the other multimedia data distributing/purchasing devices $1'_1$ to $1'_3$).

The authentication unit 15 authenticates with the multimedia data purchaser (at Step S5101) when the purchase request is sent from the multimedia data purchaser through the communication unit 16 and the Internet 9. In a case where the result is that the mutual authentication is not completed (at Step S5102), a predetermined error recovery is made (at Step S5103).

In a case where the mutual authentication is completed (at Step S5102), on the other hand, the attribute information generation unit 13 awaits receptions of the information specifying the purchased multimedia data such as the title and author of the multimedia data and the information specifying the multimedia data purchaser, from the multimedia data purchaser through the communication unit 16 and the Internet 9 (at Step S5104). The attribute information generation unit 13 reads out the information, which is stored in advance in the storage unit 20 to specify the multimedia data distributor (i.e., the owner of the multimedia data distributing/purchasing devices $1'_1$ to $1'_3$), from the storage unit 20, and generates and stores the attribute information containing those information, the information specifying the multimedia data to be purchased such as the title and author of the multimedia data and the information specifying the multimedia data purchaser, in the attribute information holding unit 23 (at Step S5105). In addition, the multimedia data to be purchased, which is made to correspond to the title and author of the multimedia data received from the multimedia data purchaser, are retrieved from the multimedia data database 21, and their copies are stored in the multimedia data holding unit 22.

The watermark extracting unit 17 uses the electronic watermarking method, which has been determined in advance with the ID verifying center side device 5', to examine whether or not the bit number information are embedded as the meta-information in the multimedia data to be purchased, as held by the multimedia data holding unit 22 (at Step S5106).

In a case where the examination finds out that the bit number information are embedded (at Step S5107), the watermark extracting unit 17 extracts and stores the bit number information in the bit number information holding unit 19 (at Step S5108). Then, the additional ID number issuing unit 18 issues the additional ID number of a predetermined bit length or a unique number which is not registered in the additional ID number database 29 (at Step S5109), and registers the issued additional ID number in the additional ID number database 29 in a manner to correspond to the attribute information stored in the attribute information holding unit 23. In addition, the additional ID number is also stored in the additional ID number holding unit 28 (at Step S5110).

The watermark embedding unit 14a extracts the watermarking method information embedded as the meta-information, from the multimedia data to be purchased, which is held by the multimedia data holding unit 22, by using the electronic watermarking method determined in advance with the ID verifying center side device 5', and reads out the algorithm of the electronic watermarking method specified by the extracted information, from the watermarking method rule storage unit 26 (at Step S5111). In accordance with the read algorithm, moreover, the watermark embedding unit 14a embeds the additional ID number held in the additional ID number holding unit 28, as a bit string starting from the next bit of the bit string specified by the bit number information held in the bit number information holding unit 19, in the multimedia data to be purchased (at Step S5112). In addition, by using the electronic watermarking method determined in advance with the ID verifying center side device 5', the watermark embedding unit 14a updates the bit number information which are embedded as the meta-information in the multimedia data to be purchased (at Step S5113). Then, the multimedia data thus having the additional ID number embedded therein are stored in the watermarked multimedia data holding unit 25.

The communication unit 16 transmits the watermarked multimedia data, which is stored in the watermarked multimedia data holding unit 25, to the multimedia data purchaser through the Internet 9 (at Step S5114).

In a case where it is found out that the bit number information are embedded (at Step S5107), on the other hand, the authentication unit 15 transmits the ID issue request to the ID issuing center side device 4' through the communication unit 16 and the Internet 9 (at Step S5115), and authenticates with the ID issuing center side device 4' (at Step S5116). In a case where the result is that the mutual authentication is not completed (at Step S5117), the authentication unit 15 transmits the error information to the multimedia data purchaser through the communication unit 16 and the Internet 9 (at Step S5118), and then performs the predetermined error recovery (at Step S5103).

In a case where the mutual authentication is completed (at Step S5117), on the other hand, the authentication unit 15 read outs the attribute information stored in the attribute information holding unit 23, and transmits the attribute information to the ID issuing center side device 4' through the communication unit 16 and the Internet 9 (at Step S5119).

After this, the communication unit 16 awaits the transmission of the basic ID number from the ID issuing center side device 4' through the Internet 9 (at Step S5120), and stores the received basic ID number in the basic ID number holding unit 24a (at Step S5121).

The watermark embedding unit 14a embeds the basic ID number stored in the basic ID number holding unit 24a, as the watermark information in the multimedia data to be purchased, which is held in the multimedia data holding unit 22 (at Step S5122). Next, the watermark embedding unit 14a uses the electronic watermarking method determined in advance with the ID verifying center side device 5', to embed the watermarking method information indicating the electronic watermarking method used when the basic ID number in the multimedia data to be purchased, as the meta-information in the multimedia data to be purchased (at Step S5123). Then, the multimedia data having the basic ID number the meta-information embedded therein are stored in the watermarked multimedia data holding unit 25.

The communication unit 16 transmits the watermarked multimedia data, which is stored in the watermarked multimedia data holding unit 25, to the multimedia data purchaser through the Internet 9 (at Step S5114).

Here will be described the ID issuing center side device 4'.

Figure 25:
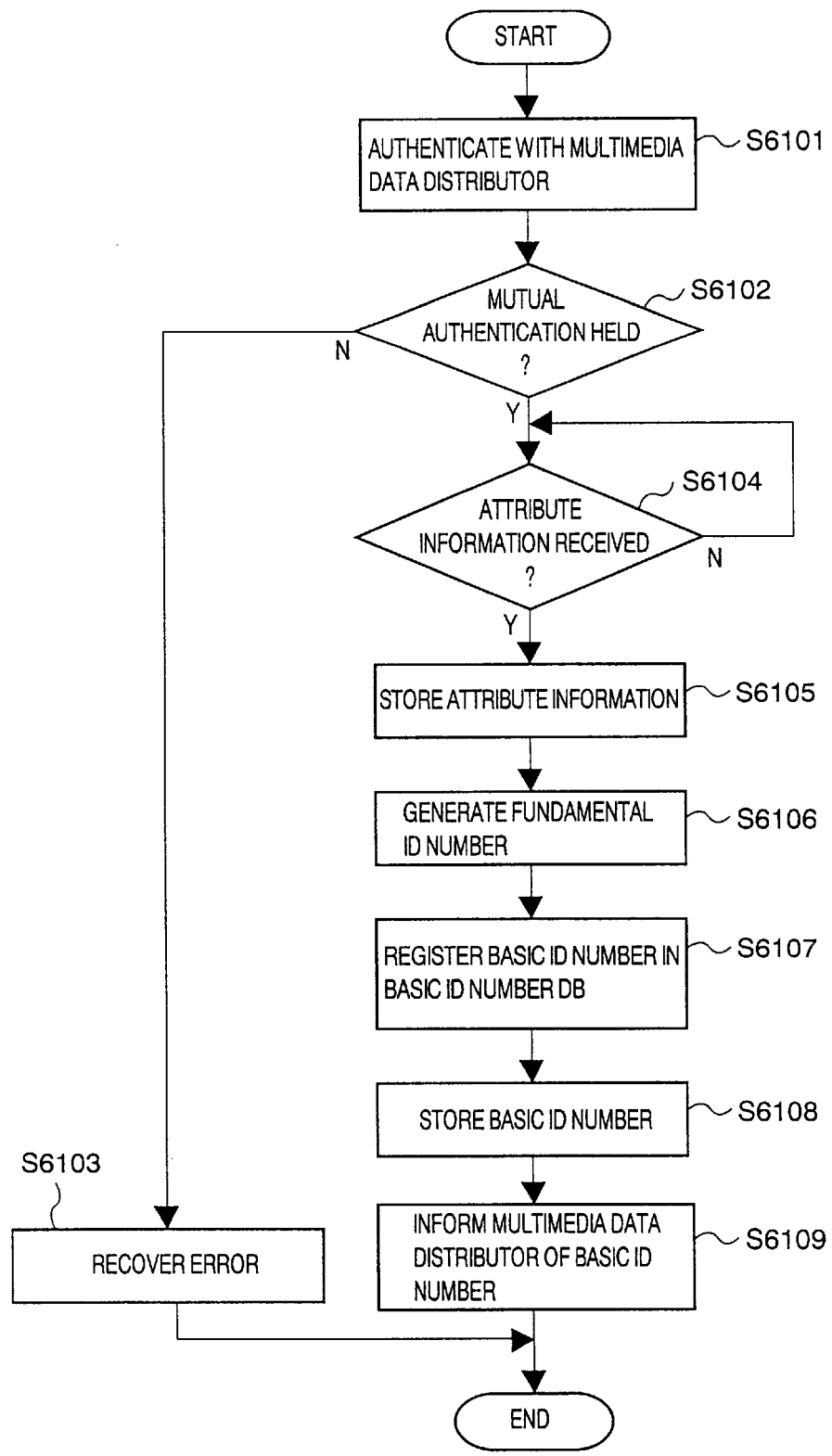
FIG. 25 is a flow chart showing operation of an ID issuing center side device 4' shown in FIG. 18.

FIG. 25 is a flow chart showing operation of the ID issuing center side device 4'. This flow is started when the ID issue request transmitted from the multimedia data distributing/purchasing devices $1'_1$ to $1'_3$ is received.

When the ID issue request is sent from the multimedia data distributor (or the multimedia data distributing/purchasing devices $1'_1$ to $1'_3$) through the communication unit 36 and the Internet 9, the authentication unit 35 mutually authenticates with the multimedia data distributor (at Step S6101). As a result, In a case where the mutual authentication is not completed (at Step S6102), a predetermined error recovery is performed (at Step S6103). When the mutual authentication is completed (at Step S6102), on the other hand, the communication unit 36 awaits reception of the attribute information from the multimedia data distributor through the Internet 9 (at Step S6104) and stores the received attribute information in the attribute information holding unit 43 (at Step S6105).

The basic ID issuing unit 33a generates a basic ID number or a unique number which is not registered in the basic ID number database 41a, in accordance with the rule stored in the basic ID issuing rule storage unit 42a (at Step S6106), and registers the basic ID number in the basic ID number database 41a in a manner to correspond to the attribute information held in the attribute information holding unit 43 (at Step S6107). In addition, the basic ID issuing unit 33a stores the basic ID number in the basic ID number holding unit 44a (at Step S6108). The communication unit 36 transmits the basic ID number stored in the basic ID number holding unit 44a, to the multimedia data distributor through the Internet 9 (at Step S6109).

Here will be described the ID verifying center side device 5'.

Figure 26:
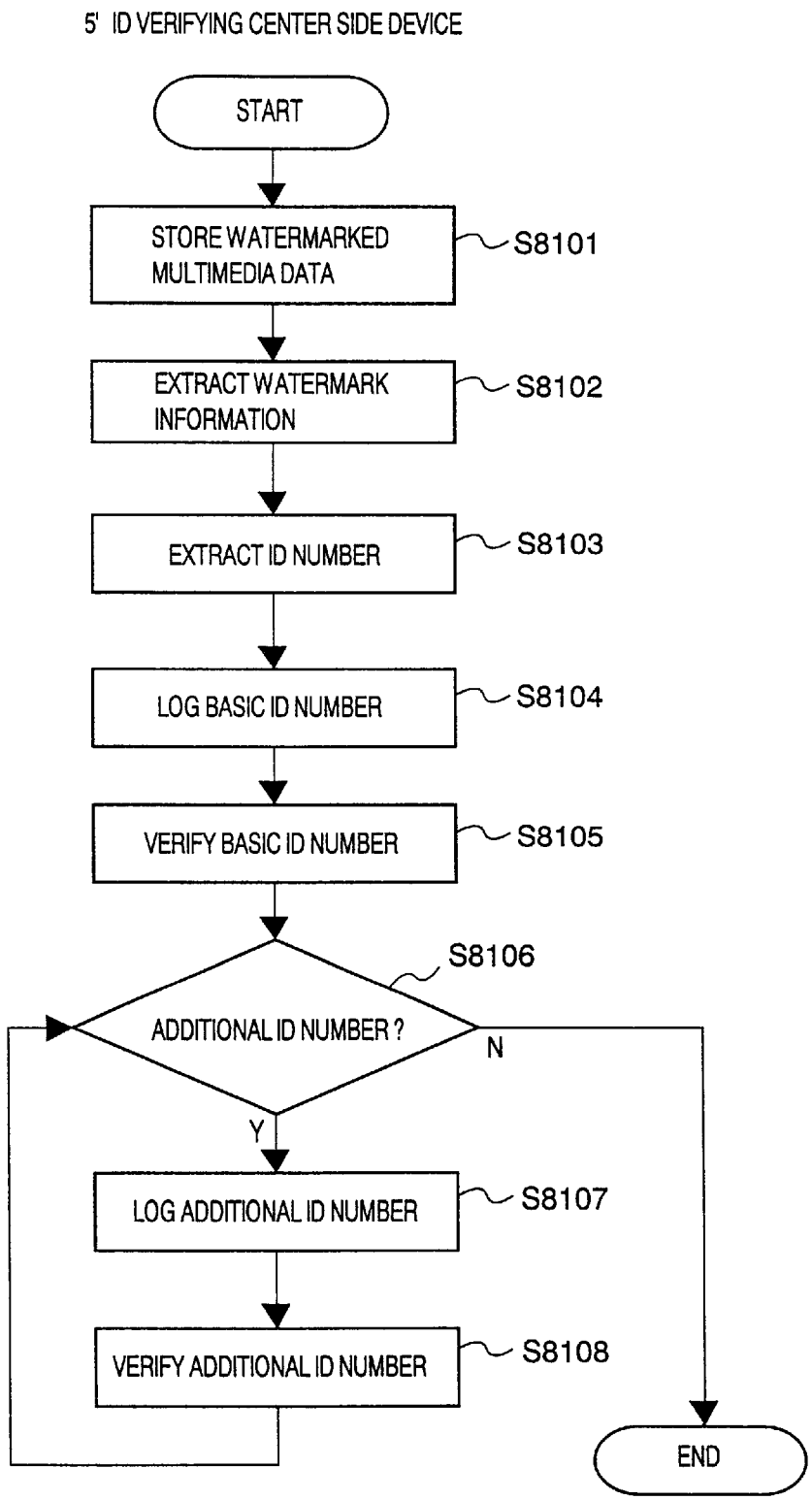
FIG. 26 is a flow chart showing operation of an ID verifying center side device 5' shown in FIG. 18.

FIG. 26 is a flow chart showing operation of the ID verifying center side device 5' of a case in which the ID number is extracted from the watermarked multimedia data to verify the attribute information. This flow is started when the watermarked multimedia data are brought into the ID verifying center side device 5' either through the Internet 9 or by recording them in a recording medium such as a CD-ROM or an FD.

The watermarked multimedia data, which is brought in through the communication unit 56 (in a case of via the Internet 9) or the input/output unit 51 (in a case of via the recording medium), are stored in the watermarked multimedia data holding unit 64 (at Step S8101).

The watermark extracting unit 54 reads out the watermarked multimedia data, which is stored in the watermarked multimedia data holding unit 64, and extracts the meta-information from the watermarked multimedia data (at Step S8102) by using the electronic watermarking method which has been predetermined between the multimedia data distributing/purchasing devices $1'_1$ to $1'_3$ (at Step S8102).

The watermark extracting unit 54 reads out the algorithm of the electronic watermarking method, which is specified by the extracted watermarking method information, from the watermarking method rule storage unit 63, and extracts the ID number from the watermarked multimedia data in accordance with the algorithm and stores it in the ID number holding unit 62 (at Step S8103). In the present embodiment, as has been described above, in a case where the additional ID number is to be embedded in the multimedia data having the basic ID number embedded therein, the additional ID number is embedded as a bit string starting from the next bit of the bit string indicating the basic ID number, by using the electronic watermarking method used to embed the basic ID number. Even in a case where the additional ID number is embedded in the multimedia data having the embedded basic ID number, the number composed of the basic ID number and the additional ID number can be extracted as one ID number from the multimedia data.

The ID verification unit 53a logs a portion (i.e., a bit string from the leading bit of the ID number to a portion corresponding to the bit length of the basic ID number) of the basic from the ID number which is held in the ID number holding unit 62 (at Step S8104). Then, the ID verification unit 53a makes an access to the basic ID number database 41 of the ID issuing center side device 4' through the communication unit 56 and the dedicated communication line 2 or the Internet 9, and verifies the attribute information which are made to correspond to the logged portion (at Step S8105).

The ID verification unit 53a examines whether or not the portion corresponding to the additional ID number is contained in the ID number held in the ID number holding portion 62 (at Step S8106). This can be made by examining whether or not the ID number held in the ID number holding unit 62 is longer than the bit length of the basic ID number. In a case where the ID number held in the ID number holding unit 62 contains the portion corresponding to the additional ID number, a portion (i.e., a bit string to the portion corresponding to the bit length of the additional ID number, from the bit succeeding to the bit string from the leading bit of the ID number to the portion corresponding to the bit length of the basic ID number) is logged (at Step S8107). Then, the ID verification unit 53a: accesses to the basic ID number database 41 of the ID issuing center side device 4' through the communication unit 56 and the dedicated communication line 2 or the Internet 9; retrieves the additional ID number database 29 of the multimedia data distributor devices $1'_1$ to $1'_3$ specified by the purchaser information of the multimedia data contained in the attribute information verified previously; and verifies the attribute information corresponding to the logged portion (at Step S8108).

The ID verification unit 53a returns to Step S8106, at which whether or not the portion corresponding to all the additional ID numbers contained in the ID numbers held in the ID number holding unit 62 has been verified. This can be made by examining whether or not the ID number held in the ID number holding unit 62 is longer than the bit length which is the sum of the bit length of the basic ID number and the bit length of all the additional ID numbers having been verified. In a case where there has not been verified the portion corresponding to all the additional ID numbers contained in the ID numbers held in the ID number holding unit 62, the operations of Steps S8107 to S8108 are repeatedly executed in the manners described above. Thus, the distribution route of the multimedia data is grasped.

The second embodiment of the invention has been described hereinbefore.

In the present embodiment, the distributor of the multimedia data (i.e., the multimedia data distributing/purchasing devices $1'_1$ to $1'_3$) examines whether or not the bit number information of the ID numbers embedded in the multimedia data are embedded as the meta-information in the multimedia data to be distributed. In a case where said information are not embedded, it can be thought that the multimedia data are distributed at first on the market. In this case, the attribute information of the multimedia data are transmitted to the ID issuing center side device 4'. In response to this, the ID issuing center side device 4' generates and registers the basic ID number in the basic ID number database 41a in a manner to correspond to the attribute information transmitted by the distributor of the multimedia data. Then, the basic ID number is transmitted to the distributor of the multimedia data.

In a case where the information are embedded, on the other hand, it is thought that the multimedia data have already been distributed and are copied and distributed again (so that the multimedia data have already had the ID number embedded therein). In this case, the distributor of the multimedia data generates the additional ID number and registers the additional ID number data in the additional ID number database 29 in a manner to correspond to the attribute information of the multimedia data.

In a case where the basic ID number is transmitted from the ID issuing center side device 4', the distributor of the multimedia data embeds the basic ID number as the watermark information in the multimedia data to be distributed, and embeds the bit number information of the embedded basic ID number in the multimedia data by the predetermined electronic watermarking method which is determined in advance with the ID verifying center side device 5'.

In a case where the distributor himself of the multimedia data issues the additional ID number, on the other hand, the additional ID number is embedded, as a bit string starting from the next bit of the bit string specified by the bit number information extracted from the multimedia data to be distributed, in the multimedia data, and the bit number information embedded in the multimedia data are updated by the predetermined electronic watermarking method which is determined in advance with the ID verifying center side device 5'.

With the construction thus far described, according to the present embodiment, the unique ID number can be attached to each of the multimedia data appearing on the market.

On the other hand, the ID verifying center side device 5' verifies the multimedia data having the embedded ID number, by extracting the ID number thus embedded from the multimedia data appearing on the market and by retrieving the basic ID number database 41 of the ID issuing center side device 4' and the additional ID number database 29 of the distributor of the multimedia data. In a case where the multimedia data are unlawfully copied, for example, the person having copied unlawfully or having allowed to copy unlawfully can be specified by specifying the purchaser of the multimedia data, as described above. In addition, according to this embodiment, even in a case where the once distributed multimedia data are copied and distributed again, the additional ID number succeeding to the basic ID number embedded in the original multimedia data is embedded in the copied data. By retrieving the basic ID number database 41a and the additional ID number database 29, therefore, it is possible to know what distribution route the multimedia data have been distributed on.

In the present embodiment, in addition, the multimedia data distributing/purchasing devices $1'_1$ to $1'_3$ embed the information indicating the electronic watermarking method, as used at the time of embedding the basic ID number in the multimedia data, which is the meta-information in the multimedia data having the basic ID number embedded therein, by using the electronic watermarking method which has been determined in advance with the ID verifying center side device 5'. Then, this ID verifying center side device 5' extracts at first the meta-information from the multimedia data by using the electronic watermarking method predetermined with the multimedia data distributing/purchasing devices $1'_1$ to $1'_3$, and then reads out the algorithm of the electronic watermarking method indicated by the extracted meta-information, from the watermarking method rule storage unit 63 which is stored with the algorithm of the electronic watermarking method submitted in advance by the multimedia data distributing/purchasing devices $1'_1$ to $1'_3$, so that it extracts the ID number from the multimedia data in accordance with the algorithm thus read out. According to the present embodiment, therefore, the multimedia data distributing/purchasing devices $1'_1$ to $1'_3$ for embedding the basic ID number at first in the multimedia data can embed the basic ID number by using a desired electronic watermarking method.

The present invention has been described in connection with its individual embodiments.

Hereinabove, the individual embodiments have been described on the cases in which the watermarking method information indicating the electronic watermarking method used for embedding the ID number in the multimedia data and the bit number information of the ID number embedded in the multimedia data are embedded as the meta-information in the multimedia data. However, the present invention should not be limited to those cases but may be modified such that in addition to the aforementioned information, for example, information indicating whether the purchase or use of the multimedia data is free or not or information specifying the application or device to indicate the multimedia data are embedded.

In addition, in each of the embodiments, each multimedia data distributing/purchasing device may embed unique management information in addition to the ID number sent from the ID issuing center side device, in the multimedia data in a manner to exert no influence on the extraction of the meta-information and the ID numbers.

In each of the foregoing embodiments, moreover, the ID verifying center side device and the ID issuing center side device may be installed over a common information processing device.

On the other hand, the individual embodiments have been described on the case in which the electronic watermarking technology is applied as the method for giving the ID number to the multimedia data. However, the present invention can also be widely applied to a case in which the ID number is given to the multimedia data by another method.

As has been described hereinbefore, according to the present invention, a unique ID number can be given to each of electronic data in a case where the multimedia data such as books or musics are distributed by utilizing the communications as the electronic data.

The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. A method for distributing multimedia data as electronic data to a purchaser of the multimedia data in a multimedia data distribution system including an ID issuing center side device and a multimedia data distributor side device, comprising, at said multimedia data distributor side device:
    transmitting attribute information of the multimedia data to be distributed, to said ID issuing center side device;
    embedding an ID number or an additional ID number transmitted from said ID issuing center side device in response to said attribute information transmitting step, as an watermark information in the multimedia data to be distributed; and
    distributing the multimedia data, in which the ID number or the additional ID number are embedded as the watermark information at said watermark information embedding step, to the purchaser of the multimedia data, and at said ID issuing center device:
    retrieving the ID number corresponding to the attribute information partially coincident with the attribute information transmitted from said multimedia data distributor side device, from a database in which the ID number already issued by said ID issuing center side device is registered to correspond to the attribute information,
    generating, in a case where the retrieval at said retrieval step results in that the ID number corresponding to the attribute information partially coincident with the attribute information transmitted from said multimedia data distributor side device is not registered yet in said database, a unique basic number which is not registered in said database, and registers said basic number as the ID number in said database in a manner to correspond to the attribute information transmitted from said multimedia data distributor side device, and generating, in a case where the ID number corresponding to the attribute information partially coincident with the attribute information transmitted from said multimedia data distributor side device is already registered in said database, an additional number so that a number obtained by attaching said additional number to said ID number may be a unique number which is not registered, and registers the number, which is obtained by attaching the additional number to said ID number, as the ID number in said database in a manner to correspond to the attribute information transmitted from said multimedia data distributor device; and transmitting, in a case where the basic number is generated at said ID number generating step, the basic number as the ID number to said multimedia data distributor side device, and transmits, in a case where the additional number is generated at said ID number generating step, the additional number as an additional ID number together with bit number information of the original ID number having said additional number attached thereto at said ID number generating step, to said multimedia data distributor side device, and wherein said watermark information embedding embeds, in a case where the additional ID number is transmitted from said ID issuing center side device, the additional ID number, as a bit string starting from the next bit of a bit string specified by the bit number information sent together with said additional ID number, in the multimedia data to be distributed, the embedding of the ID number or the additional ID number providing for tracking of an entire distribution route of the multimedia data.

2. The multimedia data distributing method according to claim 1, wherein:

said attribute information includes information capable of specifying a name, title, author, distributor and purchaser of the multimedia data, and said retrieval step retrieves the ID number, in which the attribute information transmitted from said multimedia data distributor side device and the title and author of the multimedia data are coincident and which is made to correspond to the attribute information indicating a distributor of said attribute information is a purchaser, from said database.

3. The multimedia data distributing method according to claim 1, wherein said multimedia data distributing system further includes an ID verifying center side device, further comprising, at said ID verifying center side device, a verification step of extracting the ID number from the electronic data indicating the multimedia data, in which said ID number is embedded as the watermark information, to verify said multimedia data by retrieving the attribute information corresponding to said ID number with said database.

4. The multimedia data distributing method according to claim 1, wherein said watermark information embedding step embeds, in a case where the ID number is transmitted from said ID issuing center side device, a watermarking method specifying information for specifying an electronic watermarking method used to embed said ID number in the electronic data indicating said multimedia data to be distributed, in said multimedia data by a predetermined electronic watermarking method which is determined in advance with said ID verifying center side device, and said watermark information embedding step embeds, in a case where the additional ID number is transmitted from said ID issuing center side device, extracts the watermarking method specifying information from the electronic data indicating said multimedia data to be distributed, by said predetermined electronic watermarking method, and embeds said additional ID number in said electronic data by using the electronic watermarking method specified by the extracted watermarking method specifying information.

5. The multimedia data distributing method according to claim 4, wherein said multimedia data distribution system further includes an ID verifying center side device, further comprising, at said ID verifying center side device, a verification step of extracting a watermarking method specifying information from the multimedia data, in which the ID number is embedded as the watermark information, and extracting the ID number from said multimedia data by using the electronic watermarking method specified by the extracted watermarking method specifying information, to verify said multimedia data by retrieving the attribute information corresponding to said ID number with said database.

6. The multimedia data distributing method according to claim 1, the entire distribution route being retrievable from the database.

7. A method for distributing multimedia data as electronic data to a purchaser of the multimedia data in a multimedia data distribution system including an ID issuing center side device and a multimedia data distributor side device, comprising, at the multimedia data distributor device, attempting to extract the ID number which is embedded as electronic watermark information in the multimedia data to be distributed;

transmitting, in a case where the ID number is extracted at said extraction step from the multimedia data to be distributed, said ID number and attribute information of the electronic data indicating the multimedia data to be distributed, to said ID issuing center side device, and transmitting, in a case where the ID number is not extracted at said extraction step from the multimedia data to be distributed, attribute information of the electronic data indicating the multimedia data to be distributed to said ID issuing center side device;

embedding the ID number or an additional ID number transmitted from said ID issuing center side device in response to said attribute information transmitting step, as a watermark information in the multimedia data to be distributed; and distributing the multimedia data, in which the ID number or the additional ID number are embedded as the watermark information at said watermark information embedding step, to the purchaser of the multimedia data, and at said ID issuing center side device, generating, in a case where only the attribute information are transmitted from said multimedia data distributor side device, a unique basic number, which is not registered yet in a database and registering the unique basic number as the ID number in said database in a manner to correspond to the attribute information transmitted from the multimedia distributor;

generating, in a case where the attribute information and the ID number are transmitted from said multimedia data distributor side device, an additional number so that a number obtained by attaching the additional number to said ID number may be a unique number which is not registered in said database, after it is confirmed that said ID number is registered in said database, and registering the number, which has been obtained by attaching the additional number to said ID number, as the ID number in said database in a manner to correspond to the attribute information transmitted from said multimedia data distributor device; and transmitting, in a case where the basic numbers is generated at said ID number generating step, said basic numbers as the ID number to said multimedia data distributor device and, in a case where the additional number is generated at said ID number generating step, said additional number as the additional ID number to said multimedia data distributor side device, wherein said watermark information embedding step embeds, in a case where the additional ID number is transmitted from said ID issuing center side device, the additional ID number, as a bit string starting from the next bit of a bit string specified by the bit number information sent together with said additional ID number, in the multimedia data to be distributed, the embedding of the ID number or the additional ID number providing for tracking of an entire distribution route of the multimedia data.

8. The multimedia data distributing method according to claim 7, the entire distribution route being retrievable from the database.

9. A method for distributing multimedia data to a purchaser of the multimedia data in a multimedia data distribution system including an ID issuing center side device and a multimedia data distributor side device, comprising, at the multimedia data distributor side device:
extracting a bit number information embedded in the multimedia data to be distributed, by a predetermined electronic watermarking method;

transmitting, in a case where said bit number information extracting step has failed to extract the bit number information from the multimedia data to be distributed, attribute information of the multimedia data to be distributed, to said ID issuing center side device;

embedding a basic ID number transmitted from said ID issuing center side device in response to said attribute information transmitting step, as an watermark information in said multimedia data to be distributed, and embedding the bit number information of said embedded basic ID number in said multimedia data by said predetermined electronic watermarking method;

generating, in a case where the bit number information are extracted at said bit number information extracting step from the multimedia data to be distributed, an additional ID number and registering said additional ID number in an additional ID number database in a manner to correspond to the attribute information of said multimedia data to be distributed;

embedding the additional ID number generated at said additional ID number generating step, as a bit string starting from the next bit of a bit string specified by the bit number information extracted at said bit number information extracting step, in the multimedia data to be distributed, and updating the bit number information embedded in said multimedia data to be distributed, by using said predetermined electronic watermarking method; and distributing said multimedia data in which the basic or additional ID number is embedded as the watermark information at said first or second watermark information embedding step, to the purchaser of said multimedia data, and at said ID issuing center side device:
generating the basic ID number in response to the attribute information transmitted from said multimedia data distributor device, and registering said basic ID number in a basic ID number database in a manner to correspond to said attribute information; and transmitting the basic ID number, as generated at said basic ID number generating step, to said multimedia data distributor side device, wherein, the embedding of the basic ID number and the additional ID number providing for tracking of an entire distribution route of the multimedia data.

10. The multimedia data distributing method according to claim 9,
wherein said attribute information include information capable of specifying a title, author, distributor and purchaser of the multimedia data.

11. The multimedia data distributing method according to claim 10, wherein an ID verifying center side device is provided,
further comprising, at said ID verifying center side device, a verification step of extracting the ID number from the multimedia data, in which said ID number is embedded as the watermark information, to verify said multimedia data by retrieving the attribute information corresponding to said ID number with said basic ID number database and said additional ID number database.

12. A multimedia data distributing method according to claim 10, wherein
said first watermark information embedding step embeds the watermarking method specifying information for specifying the electronic watermarking method, which is used when the basic ID number transmitted by said ID issuing center side device to the multimedia data to be distributed, in said electronic data by said predetermined electronic watermarking method, and said second watermark information embedding step extracts the watermarking method specifying information from the multimedia data to be distributed, by said predetermined electronic watermarking method, to embed said additional ID number in said multimedia data by using the electronic watermarking method specified by the extracted watermarking method specifying information.

13. The multimedia data distributing method according to claim 12, wherein an ID verifying center side device is provided,
further comprising, at said ID verifying center side device, a verification step of extracting the watermarking method specifying information from the multimedia data, in which said ID number is embedded as the watermark information, and extracting the ID number from said multimedia data by using the electronic watermarking method specified by the extracted watermarking method specifying information, to verify said multimedia data by retrieving the attribute information corresponding to said ID number with said basic ID number database and said additional ID number database.

14. The multimedia data distributing method according to claim 9, the entire distribution route being retrievable from the database.

15. A method for distributing multimedia data to a purchaser of the multimedia data in a multimedia data distribution system including an ID issuing center side device and a multimedia data distributor side device, comprising, at the multimedia data distributor device:

transmitting, in a case where an ID number is given to the electronic data indicating the multimedia data to be distributed, the said ID number and attribute information of said multimedia data to be distributed, to said ID issuing center side device and, in a case where the ID number is not given to the multimedia data to be distributed, the attribute information of the multimedia data to be distributed, to said ID issuing center side device;

giving the ID number or an additional ID number transmitted from said ID issuing center side device in response to said attribute information transmitting step, to the electronic data indicating said multimedia, data to be distributed; and distributing said multimedia data, which is given the ID number or the additional ID number at said ID number giving step, to the purchaser of said multimedia data, and at said ID issuing center side device:

generating, in a case where only the attribute information are transmitted from said multimedia data distributor side device, a unique basic number, which is not registered yet in a database in which the ID number issued already by said ID issuing center side device is registered to correspond to the attribute information, and registering said basic number as the ID number in said database in a manner to correspond to the attribute information transmitted from said multimedia data distributor device, wherein in a case where the attribute information and the ID number are transmitted from said multimedia data distributor device, said ID number generating step confirms that said ID number is registered in said database, then generates said additional number so that a number obtained by attaching the additional number to said ID number may become a unique number which is not registered in said database, and registers the number, which has been obtained by attaching the additional number to said ID number, as the ID number in said database in a manner to correspond to the attribute information transmitted from said multimedia data distributor device; and transmitting, in a case where the basic number is generated at said ID number generating step, said basic number as the ID number to said multimedia data distributor side device and, in a case where the additional number is generated at said ID number generating step, said additional number as the additional ID number to said multimedia data distributor device, wherein said ID number giving step gives, in a case where the additional ID number is transmitted from said ID issuing center side device, said additional ID number as a number succeeding to the ID number which is already given to said multimedia data to be distributed, to said multimedia data to be distributed, the giving of the ID number or the additional ID number providing for tracking of an entire distribution route of the multimedia data.

16. The multimedia data distributing method according to claim 15, the entire distribution route being retrievable from the database.

17. A method for distributing multimedia data to a purchaser of the multimedia data in a multimedia data distribution system including an ID issuing center side device and a multimedia data distributor side device, comprising, at said multimedia data distributor side device:

transmitting, in a case where an ID number is not given to multimedia data to be distributed, attribute information indicating said multimedia data to be distributed, to said ID issuing center side device;

giving a basic ID number transmitted from said ID issuing center side device in response to said attribute information transmitting step, to said multimedia data to be distributed;

generating, in a case where the ID number is given to the multimedia data to be distributed, an additional ID number and registering said additional ID number in an additional ID number database in a manner to correspond to the attribute information of said multimedia data to be distributed;

giving the additional ID number generated at said additional ID number generating step, as a number succeeding to the ID number already given to said multimedia data to be distributed, to said multimedia data to be distributed; and distributing said multi media data, which is given the basic or additional ID number, at said first or second ID number giving step, to the purchaser of said multimedia data, and at said ID issuing center side device:

generating a basic ID number in response to the attribute information transmitted from said multimedia data distributor device, and registering said basic ID number in a basic ID number database in a manner to correspond to said attribute information; and transmitting the basic ID number, which is generated at said basic ID number generating step, to said multimedia data distributor side device, wherein, the giving of the basic ID number and the additional ID number provides for tracking of an entire distribution route of the multimedia data.

18. The multimedia data distributing method according to claim 17, the entire distribution route being retrievable from the database.

* * * * *